United States Patent
Moon et al.

(10) Patent No.: US 10,943,227 B2
(45) Date of Patent: Mar. 9, 2021

(54) APPARATUS AND METHOD FOR PROVIDING INTERACTION INFORMATION BY USING IMAGE ON DEVICE DISPLAY

(71) Applicant: SAMSUNG ELECTRONICS CO., LTD., Suwon-si (KR)

(72) Inventors: Bo-seok Moon, Gunpo-si (KR); Hee-won Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/931,996

(22) Filed: May 14, 2020

(65) Prior Publication Data

US 2020/0273019 A1     Aug. 27, 2020

Related U.S. Application Data

(63) Continuation of application No. 16/654,114, filed on Oct. 16, 2019, which is a continuation of application No. 13/975,415, filed on Aug. 26, 2013.

(30) Foreign Application Priority Data

Aug. 24, 2012 (KR) .................. 10-2012-0093291
Aug. 13, 2013 (KR) .................. 10-2013-0096192

(51) Int. Cl.
*G06Q 40/00* (2012.01)
*G06Q 20/32* (2012.01)
(Continued)

(52) U.S. Cl.
CPC ..... *G06Q 20/3278* (2013.01); *G06F 3/04886* (2013.01); *G06F 21/32* (2013.01);
(Continued)

(58) Field of Classification Search
CPC ...... G06Q 20/02; G06Q 20/023; G06Q 20/04; G06Q 20/3415; G07F 7/1008
See application file for complete search history.

(56) References Cited

U.S. PATENT DOCUMENTS

| 7,748,635 B2 | 7/2010 | Takayanagi |
| 8,799,084 B2 | 8/2014 | Florek et al. |
(Continued)

FOREIGN PATENT DOCUMENTS

| CN | 101625620 A | 1/2010 |
| CN | 201985996 U | 9/2011 |
(Continued)

OTHER PUBLICATIONS

Peterson, Lisa (Location-Based Advertising: The Key to Unlocking the Most Value in the Mobile Advertising and Location-Based Services Markets; Peterson Mobility Solutions, LLC; Dec. 2009) (Year: 2009).*

(Continued)

*Primary Examiner* — Sarah M Monfeldt
*Assistant Examiner* — Mark H Gaw
(74) *Attorney, Agent, or Firm* — Sughrue Mion, PLLC

(57) ABSTRACT

A method for providing interaction information, such as, for example, settlement information, by which a device provides the settlement information to a counterpart device, includes displaying an image which relates to an item to be used for performing the interaction, such as, for example, a credit card image of a credit card of a user of the device, on a lock screen of the device, and receiving a touch input from the user with respect to the credit card image. In the method, settlement information which corresponds to the touched credit card image is used for performing a settlement via the device.

11 Claims, 11 Drawing Sheets

(51) Int. Cl.
*H04W 4/80* (2018.01)
*G06F 21/32* (2013.01)
*G06Q 20/20* (2012.01)
*G06Q 20/22* (2012.01)
*G06Q 20/34* (2012.01)
*G06Q 20/40* (2012.01)
*G06F 3/0488* (2013.01)
*H04W 12/06* (2021.01)
*G06Q 20/18* (2012.01)
*G06Q 20/24* (2012.01)
*H04L 29/06* (2006.01)

(52) U.S. Cl.
CPC .......... *G06Q 20/18* (2013.01); *G06Q 20/20* (2013.01); *G06Q 20/202* (2013.01); *G06Q 20/223* (2013.01); *G06Q 20/227* (2013.01); *G06Q 20/24* (2013.01); *G06Q 20/32* (2013.01); *G06Q 20/322* (2013.01); *G06Q 20/327* (2013.01); *G06Q 20/3572* (2013.01); *G06Q 20/40145* (2013.01); *H04W 4/80* (2018.02); *H04W 12/06* (2013.01); *H04W 12/0608* (2019.01); *H04L 63/0861* (2013.01)

(56) References Cited

U.S. PATENT DOCUMENTS

| | | | |
|---|---|---|---|
| 9,710,139 | B2 | 7/2017 | Yoo |
| 2003/0004876 | A1* | 1/2003 | Jacobson ............ H04M 17/026 705/41 |
| 2003/0110137 | A1* | 6/2003 | Armingaud ............ G06Q 20/04 705/64 |
| 2005/0218230 | A1* | 10/2005 | Amtmann ............ G06K 7/0008 235/451 |
| 2005/0247777 | A1* | 11/2005 | Pitroda ................ G06Q 20/023 235/380 |
| 2007/0027804 | A1* | 2/2007 | Vega .................. G06Q 20/3223 705/39 |
| 2007/0165844 | A1 | 7/2007 | Little |
| 2007/0197261 | A1* | 8/2007 | Humbel ............. G07C 9/00309 455/558 |
| 2007/0284432 | A1 | 12/2007 | Abouyounes |
| 2008/0267456 | A1 | 10/2008 | Anderson |
| 2009/0083847 | A1 | 3/2009 | Fadell et al. |
| 2009/0170483 | A1* | 7/2009 | Barnett ............... G06Q 30/0601 455/414.2 |
| 2010/0001967 | A1 | 1/2010 | Yoo |
| 2010/0082481 | A1 | 4/2010 | Lin et al. |
| 2010/0146384 | A1* | 6/2010 | Peev ..................... G06F 3/0481 715/255 |
| 2010/0217707 | A1 | 8/2010 | Phillips |
| 2010/0303230 | A1 | 12/2010 | Taveau et al. |
| 2010/0306705 | A1 | 12/2010 | Nilsson |
| 2011/0251892 | A1 | 10/2011 | Laracey |
| 2011/0294467 | A1 | 12/2011 | Kim et al. |
| 2011/0295748 | A1 | 12/2011 | Wood Rifle |
| 2012/0084691 | A1 | 4/2012 | Yun |
| 2012/0090757 | A1 | 4/2012 | Buchan et al. |
| 2014/0066131 | A1 | 3/2014 | Yoo |
| 2016/0275475 | A1 | 9/2016 | Lin et al. |
| 2016/0321648 | A1 | 11/2016 | Wall et al. |
| 2017/0195473 | A1 | 7/2017 | Yun |

FOREIGN PATENT DOCUMENTS

| | | | |
|---|---|---|---|
| CN | 102282578 | A | 12/2011 |
| CN | 102446060 | A | 5/2012 |
| EP | 0 593 386 | A2 | 4/1994 |
| EP | 2 144 148 | A2 | 1/2010 |
| EP | 2490114 | A1 | 8/2012 |
| EP | 2575084 | A1 | 4/2013 |
| JP | 2007-274267 | A | 10/2007 |
| JP | 2009-99076 | A | 5/2009 |
| JP | 2011-205278 | A | 10/2011 |
| JP | 2014-535084 | A | 12/2014 |
| KR | 10-0634405 | B1 | 10/2006 |
| KR | 10-2010-0005438 | A | 1/2010 |
| KR | 10-2011-0049368 | A | 5/2011 |
| KR | 10-2011-0053137 | A | 5/2011 |
| KR | 10-2011-0094176 | A | 8/2011 |
| RU | 2 444 049 | C2 | 2/2012 |

OTHER PUBLICATIONS

Communication dated Jan. 13, 2020, issued by the Brazilian Patent Office in counterpart Brazilian Application No. BR112014032096-9.
Communication dated Mar. 18, 2020 by the Indian Patent Office in counterpart Application No. 3711/CHE/2013.
Communication dated Nov. 18, 2019 issued by the Korean Intellectual Property Office in counterpart Korean Application No. 10-2013-0096192.
Communication dated Jan. 18, 2019, from the State Intellectual Property Office of People's Republic of China in counterpart Application No. 201310376492.X.
Communication dated Jan. 29, 2019, issued by the Canadian Intellectual Property Office in counterpart Canadian Patent Application No. 2,876,587.
Communication issued by the Australian Patent Office dated Dec. 20, 2017 in counterpart Australian Patent Application No. 2013306624.
Communication issued by the Russian Patent Office dated Jan. 10, 2018 in counterpart Russian Patent Application No. 2015105966.
"Lock My Pc 4—a better way to lock your computer", FSPRO Labs, Jan. 19, 2007, total 3 pages, URL: http://web.archive.org/web/20070119022951/http://www.fspro.net:80/lock-pc/, accessed Dec. 20, 2017.
Communication dated Jun. 21, 2018, issued by the State Intellectual Property Office of P.R. China in counterpart Chinese Application No. 201310376492.X.
Communication dated Oct. 2, 2017 by the Japanese Patent Office in counterpart Japanese Patent Application No. 2013-174267.
Communication dated Oct. 9, 2017 by the State Intellectual Property Office of P.R. China in counterpart Chinese Patent Application No. 201310376492.X.
Communication dated May 23, 2017 issued by the Russian Patent Office in counterpart Application No. 2015105966/08(009602).
Communication dated Dec. 15, 2015 issued by the European Patent Office in counterpart European Patent Application No. 13 180 633.3.
International Search Report dated Dec. 24, 2013, issued by the International Searching Authority in counterpart International Application No. PCT/KR2013/007311.
Communication dated Jan. 3, 2014, issued by the European Patent Office in counterpart European Application No. 13180633.3.
Communication dated Feb. 18, 2015 issued by European Patent Office in counterpart European Application No. 13180633.3.
Communication dated Nov. 23, 2020, issued by the European Patent Office in counterpart European Application No. 20194526.8.

* cited by examiner

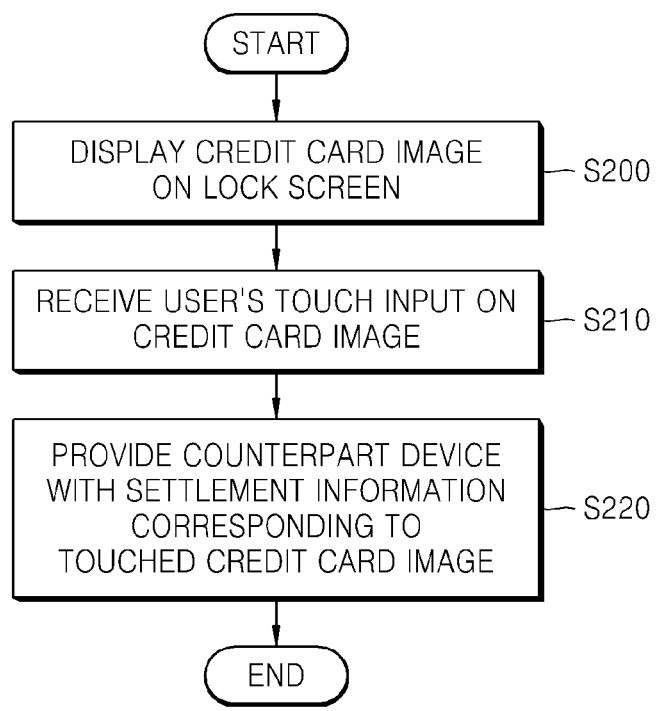

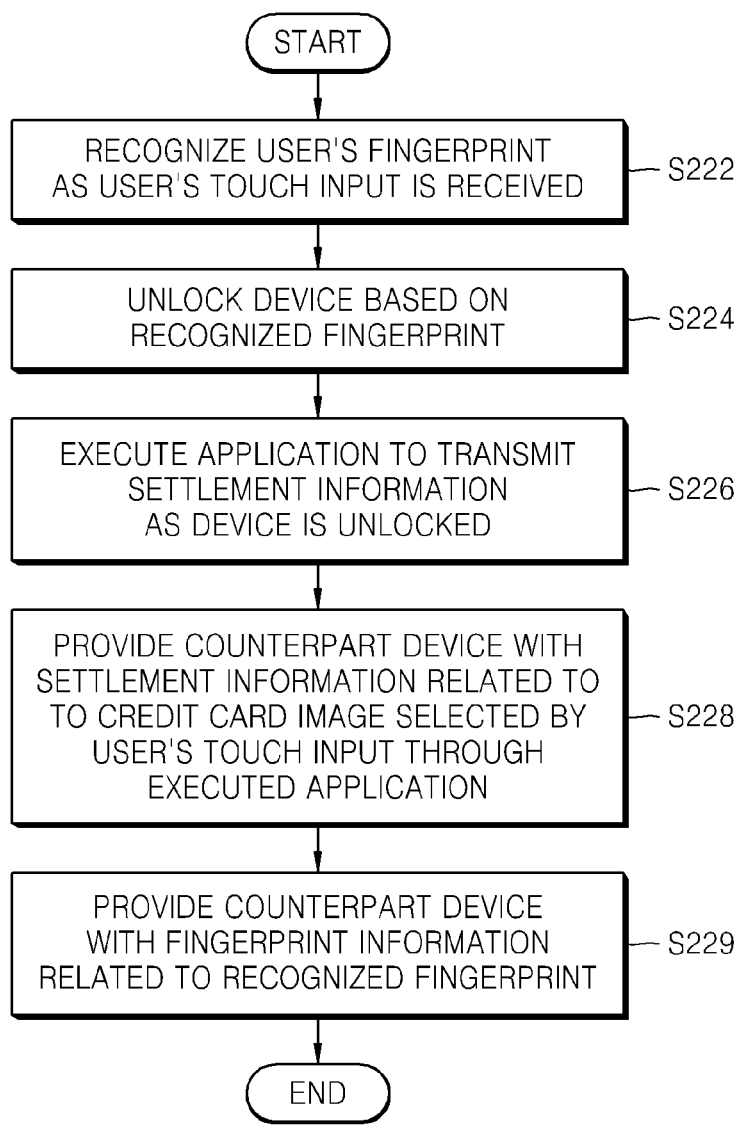

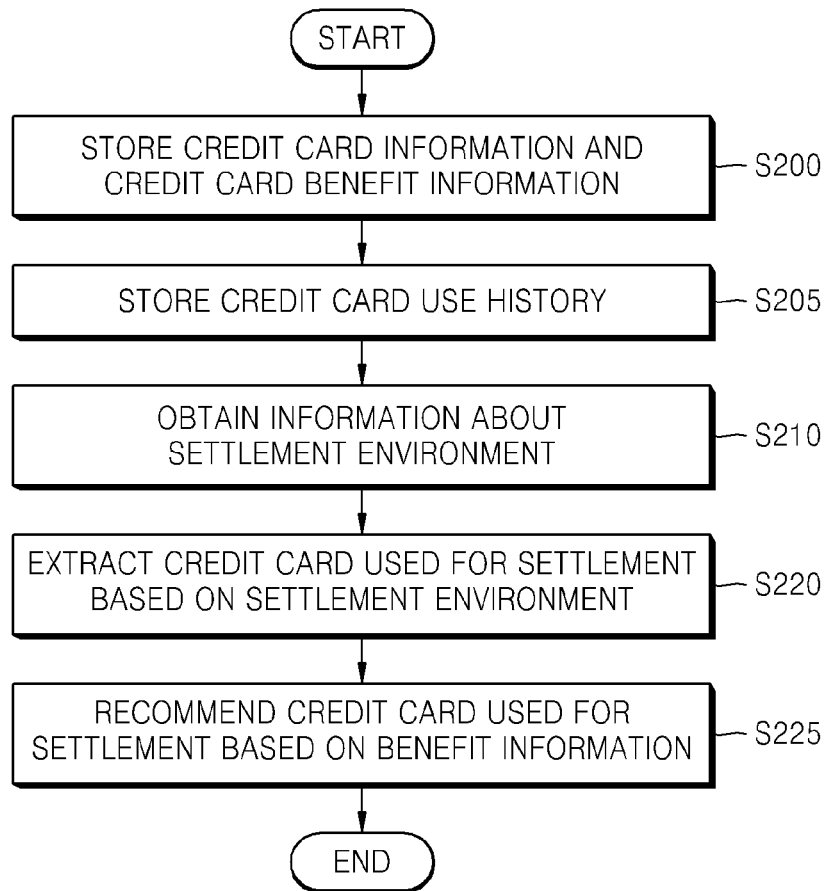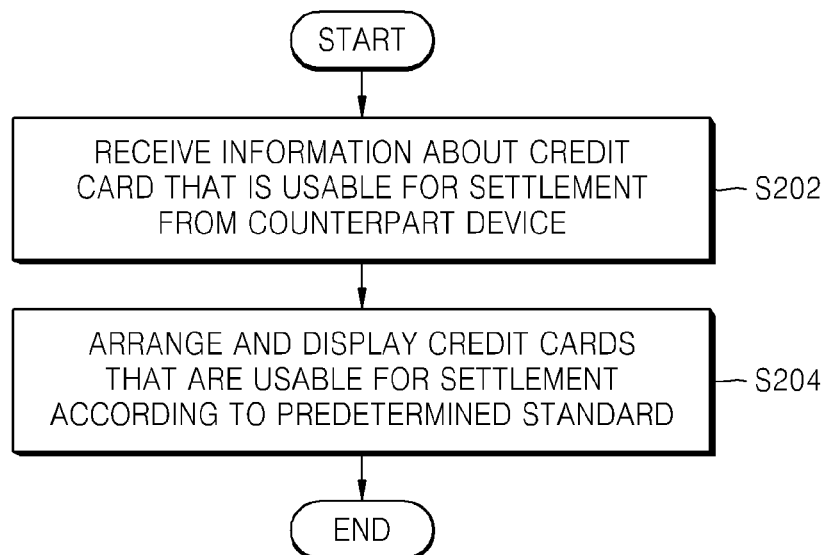

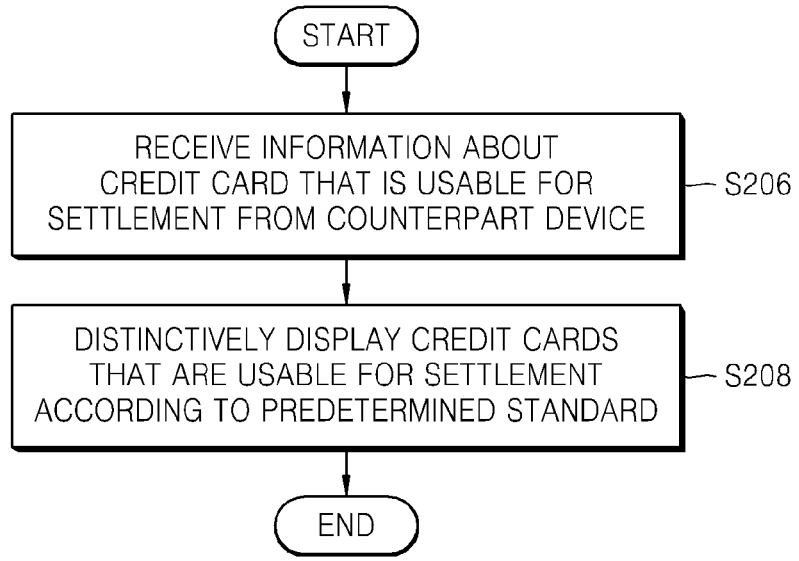
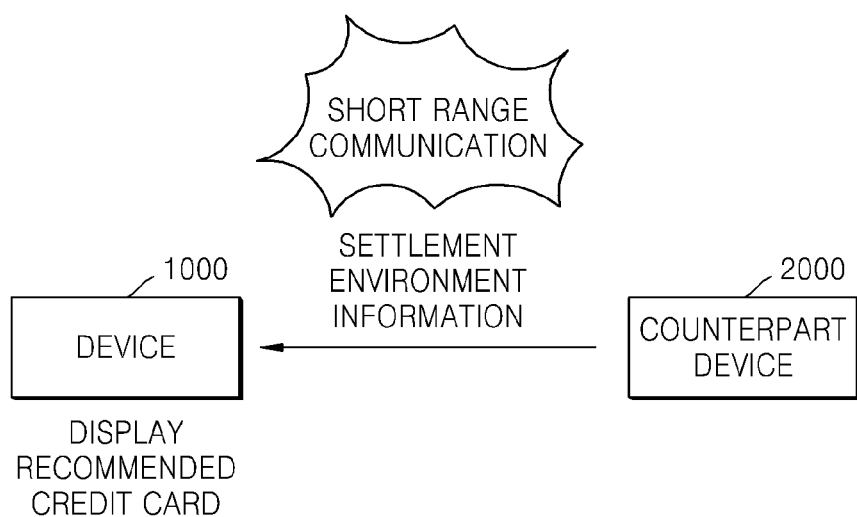

APPARATUS AND METHOD FOR PROVIDING INTERACTION INFORMATION BY USING IMAGE ON DEVICE DISPLAY

CROSS-REFERENCE TO RELATED PATENT APPLICATIONS

This application is a continuation application of U.S. patent application Ser. No. 16/654,114, filed Oct. 16, 2019, in the U.S. Patent and Trademark Office, which claims priority from U.S. patent application Ser. No. 13/975,415, filed Aug. 26, 2013, in the U.S. Patent and Trademark Office, which claims priority from Korean Patent Application No. 10-2012-0093291, filed on Aug. 24, 2012, and from Korean Patent Application No. 10-2013-0096192, filed on Aug. 13, 2013, in the Korean Intellectual Property Office, the disclosures of which are incorporated herein by reference in their entireties.

BACKGROUND

1. Field

Exemplary embodiments relate to an apparatus and method for displaying an image which relates to a potential interaction, such as, for example, a credit card image, on a display of a device, such as, for example, a lock screen of a mobile phone, and providing interaction information, such as, for example, settlement information, which is generated by using the displayed image.

2. Description of the Related Art

As the mobile communication industry has rapidly developed, mobile communication terminals are regarded as essential items. Accordingly, mobile communication terminals are equipped with various additional functions in addition to a conventional function, such as voice calling and data communication, thereby becoming multifunctional terminals.

Based on the above trend, technologies which relate to using a mobile communication terminal as a payment means by storing information about a user's credit card in the mobile communication terminal are widely suggested. Further, as society develops, payment means in various businesses have changed from cash to various types of credit payment means, such as credit cards. In addition, a reward rate and a discount rate may be variably applied, based on the type of payment means being used.

When a user wants to make a settlement by using a mobile communication terminal, it may be inconvenient to unlock the mobile communication terminal and directly operate a predetermined application. Further, in determining a credit card to use for the settlement of goods, it may be inconvenient for a user to check a reward rate and a discount rate of each credit card on an individual basis and to input authentication information for settlement to a point-of-sale (POS) terminal.

SUMMARY

Exemplary embodiments provide an apparatus and method for effectively providing settlement information to a counterpart device by using a credit card image which is displayed on a lock screen of a device.

Exemplary embodiments also provide an apparatus and method for providing settlement information, including a capability of recognizing a fingerprint of a user based on a user's touch input on a credit card image which is displayed on a lock screen.

According to an aspect of one or more exemplary embodiments, a method for using a first device to provide settlement information to a counterpart device, includes displaying, on a lock screen of the first device, a credit card image of a credit card of a user of the first device, and receiving a touch input from the user with respect to the displayed credit card image, wherein settlement information which corresponds to the received touch input is used for performing a settlement via the first device.

The method may further include providing the settlement information which corresponds to the received touch input to the counterpart device.

The method may further include providing the settlement information which corresponds to the received touch input to a settlement server.

The method may further include using the received touch input for recognizing a fingerprint of the user, and providing fingerprint information which relates to the recognized fingerprint to the counterpart device in conjunction with performing the settlement.

The method may further include using the received touch input for recognizing a fingerprint of the user, unlocking the first device based on the recognized fingerprint, and providing the settlement information to the counterpart device when the first device is unlocked.

The method may further include receiving, from the counterpart device, information which relates to a credit card that is usable for performing a settlement via the counterpart device, wherein a plurality of credit card images are displayed on the lock screen of the first device, and a credit card image which corresponds to the credit card that is usable for performing the settlement is distinctively displayed with respect to the displayed plurality of credit card images.

The displaying the credit card image on the lock screen of the first device may include displaying the credit card image on a plurality of unlock pattern points on the lock screen of the first device.

The method may further include receiving, from the counterpart device, information which relates to a credit card that is usable for performing a settlement via the counterpart device, wherein the displaying the credit card image on the lock screen of the first device may include displaying a respective credit card image on each of the plurality of unlock pattern points and an image of a pattern lock point which matches a credit card image which corresponds to the credit card that is usable for performing the settlement via the counterpart device is distinctively displayed with respect to the plurality of unlock pattern points.

The displaying the credit card image may include arranging the credit card image on the lock screen of the first device based on at least one of a number of uses of the credit card, a position of the first device, a user preference, and a points reward rate.

The method may further include executing an application for providing the settlement information when the touch input is received, wherein the settlement information is provided to at least one of the counterpart device and a settlement server as a result of executing the application.

The providing the settlement information to the counterpart device may include providing the settlement information to the counterpart device within a time interval during which the user touch input is maintained.

The method may further include providing the settlement information to the counterpart device when a distance between the first device and the counterpart device falls within a preset range.

The providing the settlement information to the counterpart device may include providing the settlement information to the counterpart device via near field communication (NFC).

The displaying the credit card image may include displaying the credit card image on the lock screen when a distance between the first device and the counterpart device falls within a preset range.

According to another aspect of one or more exemplary embodiments, a device includes a memory which is configured to store at least one program, and a processor which is configured to generate settlement information by executing the at least one program, wherein the at least one program comprises at least a first command which relates to displaying, on a lock screen of the device, a credit card image of a credit card of a user of the device, and at least a second command which relates to receiving a touch input from the user with respect to the credit card image, and the settlement information is generated based on the received touch input and is used for performing a settlement via the device.

The at least one program may further include at least a third command which relates to providing the generated settlement information to a counterpart device.

The at least one program may further include at least a third command which relates to providing the generated settlement information to a settlement server.

The at least one program may further include at least a third command which relates to using the received touch input for recognizing a fingerprint of the user and providing fingerprint information which relates to the recognized fingerprint to a counterpart device, wherein the provided fingerprint information may be used in conjunction with the performing the settlement.

The at least one program may further include at least a third command which relates to using the received touch input for recognizing a fingerprint of the user and unlocking the device based on the recognized fingerprint, wherein the processor may be further configured to provide the generated settlement information to a counterpart device when the device is unlocked.

The at least one program may further include at least a third command which relates to receiving, from a counterpart device, information which relates to a credit card that is usable for performing a settlement via the counterpart device, and at least a fourth command which relates to displaying, on the lock screen of the device, a plurality of credit card images, wherein a credit card image which corresponds to the credit card that is usable for performing the settlement via the counterpart device is distinctively displayed with respect to the displayed plurality of credit card images.

The at least first command which relates to the displaying the credit card image on the lock screen of the device may further relate to displaying the credit card image on a plurality of unlock pattern points on the lock screen of the device.

The at least one program may further include at least a third command which relates to receiving, from a counterpart device, information which relates to a credit card that is usable for performing a settlement via the counterpart device, wherein the at least first command which relates to the displaying the credit card image on the lock screen of the device may further relate to displaying a respective credit card image on each of the plurality of unlock pattern points, and a pattern lock point which matches a credit card image which corresponds to the credit card that is usable for performing the settlement via the counterpart device is distinctively displayed with respect to the plurality of unlock pattern points.

The at least first command which relates to the displaying the credit card image may further relate to arranging the credit card image on the lock screen of the device based on at least one of a number of uses of the credit card, a position of the device, a user preference, and a points reward rate.

The at least one program may further include at least a third command which relates to executing an application for providing the settlement information when the touch input is received, and the processor may be further configured to provide the generated settlement information to at least one of a counterpart device and a settlement server as a result of executing the application.

The at least third command which relates to the providing the generated settlement information to the counterpart device may further relate to providing the generated settlement information to the counterpart device within a time interval during which the user touch input is maintained.

The at least third command which relates to the providing the generated settlement information to the counterpart device may further relate to providing the generated settlement information to the counterpart device when a distance between the device and the counterpart device falls within a preset range.

The at least third command which relates to the providing the generated settlement information to the counterpart device may further relate to providing the generated settlement information to the counterpart device via near field communication (NFC).

The at least first command which relates to the displaying the credit card image may further relate to displaying the credit card image on the lock screen when a distance between the device and the counterpart device falls within a preset range.

According to another aspect of one or more exemplary embodiments, a method for using a first device to provide settlement information to a counterpart device includes displaying, on a lock screen of the first device, an identification value of a credit card of a user of the first device, and receiving a touch input from the user with respect to the displayed identification value of the credit card, wherein settlement information which corresponds to the received touch input is used for performing a settlement via the first device.

According to another aspect of one or more exemplary embodiments, a method for facilitating an interaction between a first user and a second user by using a first device which is associated with the first user is provided. The first device includes a user interface for providing an input/output capability with respect to the first user. The method includes: displaying, via the user interface and on a screen of the first device, a plurality of images which respectively correspond to a plurality of candidate items; receiving, via the user interface, a touch input from the first user with respect to the displayed plurality of images; using the first device to select, from among the plurality of candidate items, an item for use in performing the interaction, and to generate interaction information based on the received touch input; and using the received touch input and the generated interaction information in conjunction with the selected item in order to perform the interaction.

The method may further include extracting authentication information from the received touch input. The using the received touch input and the generated interaction information to perform the interaction may include checking the extracted authentication information with respect to user-specific information which is stored in the first device and using a result of the checking to determine whether the interaction is safely performable.

The authentication information may include fingerprint information which relates to the first user.

The method may further include transmitting the generated interaction information to at least one of a second device which is associated with the second user and an interaction server.

The method may further include: using the received touch input for recognizing a fingerprint of the user; unlocking the device based on the recognized fingerprint; and providing the interaction information to a second device which is associated with the second user when the first device is unlocked.

The method may further include receiving, from a second device which is associated with the second user, information which relates to an item that is usable for performing an interaction via the second device. An image which corresponds to the item that is usable for performing the interaction via the second device may be distinctively displayed with respect to the displayed plurality of images.

The displaying the plurality of images may include displaying the plurality of images on a plurality of unlock pattern points on a lock screen of the first device.

The method may further include receiving, from a second device which is associated with the second user, information which relates to an item that is usable for performing an interaction via the second device. The displaying the plurality of images may include displaying a respective item on each of the plurality of unlock pattern points, and an image of a pattern lock point which matches an image which corresponds to the item that is usable for performing the interaction via the second device may be distinctively displayed with respect to the plurality of unlock pattern points.

The method may further include executing an application for providing the interaction information when the touch input is received. The interaction information may be provided to at least one of a second device which is associated with the second user and an interaction server as a result of the executing the application.

The method may further include providing the interaction information to a second device which is associated with the second user within a time interval during which the first user touch input is maintained.

The method may further include providing the interaction information to a second device which is associated with the second user when a distance between the first device and the second device falls within a preset range.

The providing the interaction information to the second device may include providing the interaction information to the second device via near field communication (NFC).

The displaying the plurality of images may include displaying the plurality of images on a lock screen of the first device when a distance between the first device and a second device which is associated with the second user falls within a preset range.

According to yet another aspect of one or more exemplary embodiments, a first device for use in conjunction with performing an interaction between a first user and a second user includes: a display which is configured to display a plurality of images which respectively correspond to a plurality of candidate items; a transceiver which is configured to receive a touch input from the first user with respect to the displayed plurality of images; and a processor which is configured to select, from among the plurality of candidate items, an item for use in performing the interaction, to generate interaction information based on the received touch input, and to use the received touch input and the generated interaction information in conjunction with the selected item in order to perform the interaction.

The processor may be further configured to extract authentication information from the received touch input, to check the extracted authentication information with respect to user-specific information which is stored in a memory of the first device, and to use a result of the check to determine whether the interaction is safely performable.

The authentication information may include fingerprint information which relates to the first user.

The transceiver may be further configured to transmit the generated interaction information to at least one of a second device which is associated with the second user and an interaction server.

The processor may be further configured to: use the received touch input for recognizing a fingerprint of the user; unlock the first device based on the recognized fingerprint; and provide the interaction information to a second device which is associated with the second user when the first device is unlocked.

The transceiver may be further configured to receive, from a second device which is associated with the second user, information which relates to an item that is usable for performing an interaction via the second device. The processor may be further configured to cause the display to distinctively display an image which corresponds to the item that is usable for performing the interaction via the second device with respect to the displayed plurality of images.

The display may be further configured to display the plurality of images on a plurality of unlock pattern points on a lock screen of the first device.

The transceiver may be further configured to receive, from a second device which is associated with the second user, information which relates to an item that is usable for performing an interaction via the second device. The display may be further configured to display a respective item on each of the plurality of unlock pattern points. The processor may be further configured to cause the display to distinctively display an image of a pattern lock point which matches an image which corresponds to the item that is usable for performing the interaction via the second device with respect to the plurality of unlock pattern points.

The processor may be further configured to execute an application for providing the interaction information when the touch input is received. The transceiver may be further configured to transmit the interaction information to at least one of a second device which is associated with the second user and an interaction server as a result of the executing the application.

The transceiver may be further configured to transmit the interaction information to a second device which is associated with the second user within a time interval during which the first user touch input is maintained.

The transceiver may be further configured to transmit the interaction information to a second device which is associated with the second user when a distance between the first device and the second device falls within a preset range.

The transceiver may be further configured to transmit the interaction information to the second device via near field communication (NFC).

The display may be further configured to display the plurality of images on a lock screen of the first device when a distance between the first device and a second device which is associated with the second user falls within a preset range.

BRIEF DESCRIPTION OF THE DRAWINGS

The above and other features and advantages of the present inventive concept will become more apparent by describing in detail exemplary embodiments thereof with reference to the attached drawings in which:

FIG. 2 is a flowchart which illustrates a method by which the device transmits settlement information to the counterpart device, according to an exemplary embodiment;

FIG. 3 is a flowchart which illustrates a method by which the device provides settlement information which corresponds to a touched credit card image to the counterpart device, according to an exemplary embodiment;

FIG. 4 is a flowchart which illustrates a method by which the device recommends a credit card to be used for settlement based on a settlement environment, according to an exemplary embodiment;

FIG. 5 is a flowchart which illustrates a method by which the device arranges and displays credit card images on a lock screen, according to an exemplary embodiment;

FIG. 6 is a flowchart which illustrates a method by which the device distinctively displays credit card images on a lock screen, according to an exemplary embodiment;

FIG. 7 is a block diagram which schematically illustrates an example of displaying a recommended credit card as the device approaches the counterpart device, according to an exemplary embodiment;

DETAILED DESCRIPTION

Figure 1:
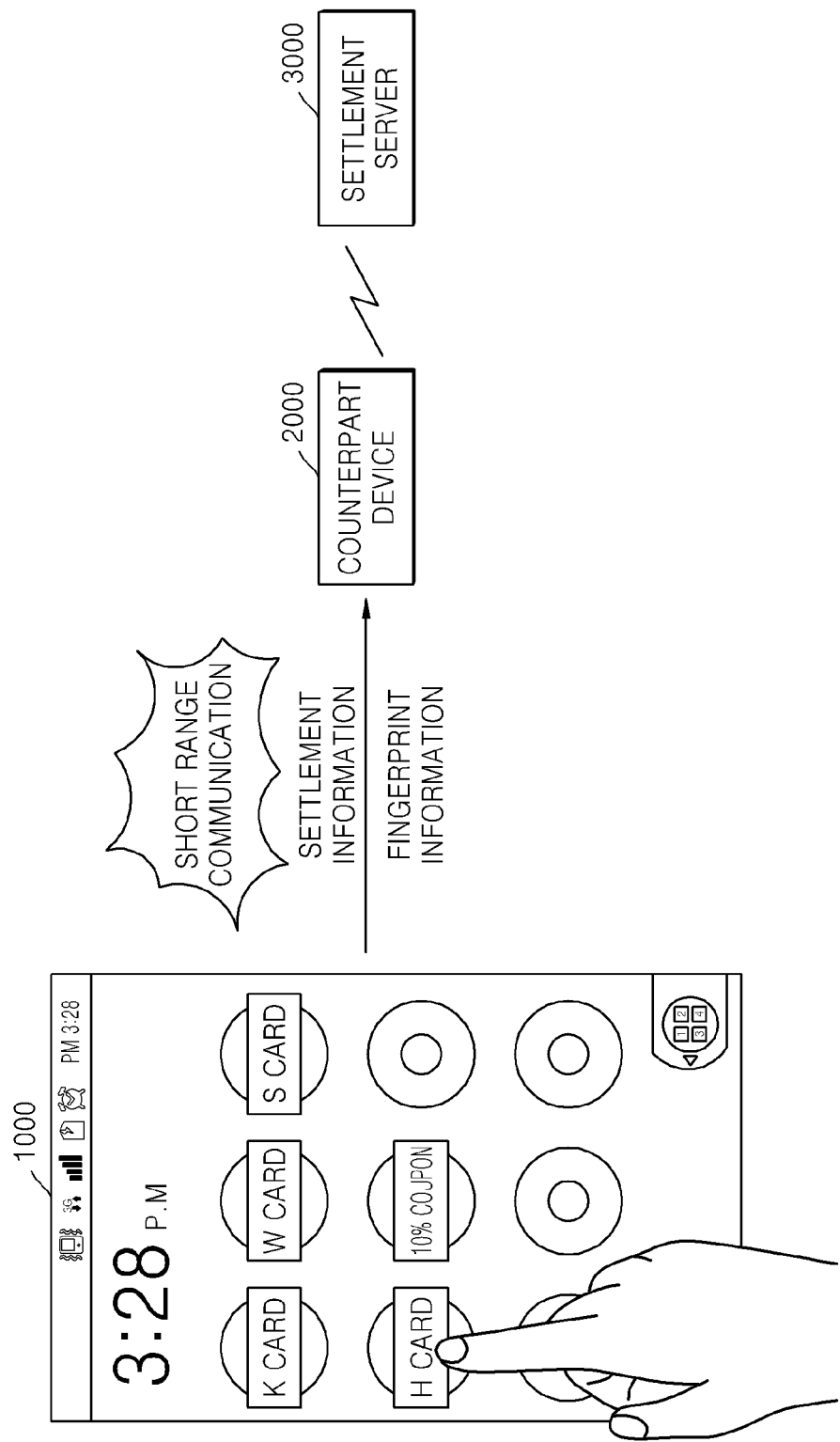
FIG. 1 is a block diagram which schematically illustrates an overall concept of a system in which a device transmits settlement information to a counterpart device, according to an exemplary embodiment.

The attached drawings for illustrating exemplary embodiments are referred to in order to gain a sufficient understanding of the exemplary embodiments, the merits thereof, and the objectives accomplished by the implementation of the exemplary embodiments. Hereinafter, the present inventive concept will be described in detail by explaining exemplary embodiments with reference to the attached drawings. Like reference numerals in the drawings denote like elements.

Expressions such as "at least one of," when preceding a list of elements, modify the entire list of elements and do not modify the individual elements of the list.

In the present specification, when a constituent element "connects" or is "connected" to another constituent element, the constituent element may contact or may be connected to the other constituent element not only "directly", but also "electrically" with other constituent element(s) therebetween. When a part may "include" a certain constituent element, unless specified otherwise, it may not be construed to exclude another constituent element, but may be construed to further include other constituent elements.

Further, although in the present specification an image of a credit card is displayed on a lock screen of a device, the exemplary embodiments are not limited thereto. An identification value of a credit card may be displayed on a lock screen of a device. In addition, information which relates to identifying a credit card, for example, a still image, moving picture, text, etc., may be displayed on a lock screen of a device.

FIG. 1 is a block diagram which schematically illustrates an overall concept of a system in which a device 1000 transmits settlement information to a counterpart device 2000, according to an exemplary embodiment. Referring to FIG. 1, the system for transmitting settlement information, according to the present exemplary embodiment, includes the device 1000, the counterpart device 2000, and a settlement server 3000. The device 1000 is used to select an appropriate credit card based on a settlement environment, and the device 1000 provides credit card information which relates to the selected credit card to the counterpart device 2000. A predetermined credit card image which is displayed on a screen of the device 1000 is selected by receiving a touch input from a user. As the device 1000 approaches the counterpart device 2000, and/or as a distance between the device 1000 and the counterpart device 2000 falls within a predetermined range, the device 1000 may transmit settlement information which relates to a credit card which corresponds to the selected credit card image to the counterpart device 2000.

In this case, at least one of a plurality of credit card images may be displayed on a lock screen of the device 1000. For example, at least one credit card image may be displayed on one of a plurality of unlock pattern points which are displayed on a lock screen of the device 1000. The unlock pattern points are points on a grid of the lock screen. Further, the device 1000 may recognize a fingerprint of a user based on a user's touch input, may unlock the device 1000 based on the recognized fingerprint, and may provide the recognized fingerprint information with settlement information to the device 1000.

Further, the counterpart device 2000 may provide the received settlement information to the settlement server 3000 so that the settlement server 3000 may perform a settlement via the device 1000.

The device 1000 may be any one or more of a smartphone, a mobile phone, a personal digital assistant (PDA), a laptop computer, a media player, a global positioning system (GPS) device. However, the present exemplary embodiment is not limited thereto, and the device 1000 may be other mobile or fixed computing devices.

Further, the counterpart device 2000 may be a point-of-sale (POS) terminal, but the present exemplary embodiment is not limited thereto. For example, the counterpart device 2000 may be any one or more of a smartphone, a mobile phone, a PDA, a laptop computer, a media player, a GPS device, and other mobile or fixed computing devices.

In another exemplary embodiment, the block diagram of FIG. 1 can be understood as representing a system for performing an interaction between a first user and a second user. The device 1000 can be understood as being associated with the first user, and the device 2000 can be understood as being associated with the second user. Although the above-described exemplary embodiment refers to the interaction as being a settlement, other interactions may be performed.

For example, a traveler may be preparing to fly on an airplane and may need to check in to obtain a boarding pass and/or to check baggage. In such a scenario, the traveler may be understood as being a first user, and the airline company may be understood as being the second user. The second device 2000 may be, for example, a kiosk at the airport, or a computer which is linked to the airline's web site on the Internet. The traveler may have a mobile phone which acts as a first device 1000, and the mobile phone may display images which correspond to items, such as, for example, a passport, a driver's license, and a personal credit card, which can be used for the purpose of checking in for the flight and/or checking baggage.

As another example, a social media user may be preparing to upload information which relates to a recent experience. In this scenario, the social media user may be understood as being a first user, and the second user may be the social media web site. The second device may be, for example, any terminal which may be used to access the social media web site. The social media user may have a mobile phone which acts as a first device 1000, and the mobile phone may display images which correspond to items, such as, for example, photographs, text messages, and uniform resource locator (URL) links, which can be selectable for the purpose of uploading information to the social media site.

FIG. 2 is a flowchart which illustrates a method by which the device 1000 transmits settlement information to the counterpart device 2000, according to an exemplary embodiment. Referring to FIG. 2, in operation S200, the device 1000 displays a credit card image on a lock screen. In operation S200, the device 1000 may display a credit card image on at least one of the unlock pattern points which are displayed on the lock screen of the device 1000. The credit card image which is displayed on the lock screen may be used by the device 1000 to unlock the device 1000. Further, the device 1000 may display at least one credit card image without displaying the unlock pattern points on the lock screen of the device 1000.

In operation S200, as a distance between the device 1000 and the counterpart device 2000 falls within a preset range, the device 1000 may display a credit card image on the lock screen of the device 1000. For example, when the device 1000 has a short range communication connection with the counterpart device 2000 via near field communication (NFC), the device 1000 may automatically display a predetermined credit card image on the lock screen of the device 1000.

Further, the device 1000 may display a plurality of credit card images by arranging the credit card images based on a predetermined standard. The device 1000 may display a predetermined credit card image with emphasis.

In operation S210, the device 1000 receives a user's touch input with respect to a credit card image. As a user touches a particular credit card image which is displayed on the lock screen of the device 1000, the device 1000 may receive the user's touch input.

In operation S220, the device 1000 provides the counterpart device 2000 with settlement information which corresponds to the received touch input, such as, for example, information which corresponds to the particular credit card image which is touched by the user. In operation S220, the device 1000 may extract credit card information which relates to the credit card image touched by the user and user information from a memory 1700 (see FIG. 14) of the device 1000, and may provide the extracted credit card information and the user information to the counterpart device 2000. The credit card information may include, for example, any one or more of information about a credit card number and a credit card expiration date, and authentication information about a credit card. The user information may include, for example, information about a user identification value and the date of birth of a user.

Further, in operation S220, the device 1000 may provide settlement information to the counterpart device 2000 when a touch input on a credit card image continues or is maintained over a predetermined time interval. When the device 1000 approaches the counterpart device 2000 within a time interval during which a touch input on a credit card image continues, the device 1000 may provide settlement information to the counterpart device 2000, but the present exemplary embodiment is not limited thereto.

In operation S220, the device 1000 may provide settlement information to the counterpart device 2000 when fingerprint information which is obtained as a result of receiving the touch input on a credit card image is effective.

The flowchart of FIG. 2 may be also be applicable to other exemplary embodiments. For example, the flowchart of FIG. 2 may be applicable to the above-described scenario of the traveler checking in for a flight and/or checking baggage for a flight. In operation S200, the traveler's mobile phone displays a respective image which corresponds to each of a passport, a driver's license, and a credit card. In operation S210, the traveler provides a touch input to the mobile phone with respect to one of the displayed images. In operation S220, the mobile phone transmits the relevant information regarding the selected item to the device 2000 which is used by the airline for completing the check-in and baggage check processes, e.g., a kiosk or a link to the airline's web site.

Similarly, the flowchart of FIG. 2 can be applied to the above-described scenario of the social media user uploading information which relates to a recent experience. In operation S200, the social media user's mobile phone displays a respective image which corresponds to each of photographs, text messages, and URLs. In operation S210, the social media user provides a touch input to the mobile phone with respect to at least one of the displayed images for a purpose which relates to the upload. In operation S220, the mobile phone transmits the relevant information regarding the selected item or items to the device 2000 which is used for performing the upload, e.g., a computer terminal or a Wi-Fi connection at a hotspot.

FIG. 3 is a flowchart which illustrates a method by which the device 1000 of FIG. 1 provides settlement information which corresponds to a touched credit card image to the counterpart device 2000, according to an exemplary embodiment. Referring to FIG. 3, in operation S222, the device 1000 recognizes a fingerprint of a user when the user's touch input is received. The device 1000 may recognize a fingerprint of a user from the lock screen of the device

1000 by using a fingerprint recognition sensor (not shown) included in the device 1000. The fingerprint recognition sensor may be, for example, at least one of an optical sensor, a heat detection sensor, a condensing sensor, and semiconductor type and/or electric field type sensors, but the present exemplary embodiment is not limited thereto.

In operation S224, the device 1000 unlocks the device 1000 based on the recognized fingerprint. The device 1000 may compare the recognized fingerprint with user's fingerprint information which has previously been stored in the device 1000, and may unlock the device 1000 when the recognized fingerprint matches the user's fingerprint information as indicated with respect to a predetermined value.

In this case, the user's fingerprint information may be stored in the device 1000 to be matched with each credit card image. The device 1000 may compare the fingerprint information which corresponds to the touched credit card image with the recognized fingerprint.

In operation S226, as the device 1000 is unlocked, the device 1000 executes an application in order to transmit settlement information. The application executed in operation S226 may provide the counterpart device 2000 with information which is useful and/or required for performing a settlement.

In operation S228, the device 1000 provides the counterpart device 2000 with settlement information which relates to the credit card image selected by the user's touch input, via the executed application. The settlement information may include at least one of credit card information about the credit card image touched by a user and user information. The credit card information may include, for example, one or more of information about a credit card number and a credit card expiration date, and authentication information about a credit card. The user information may include, for example, information about a user identification value and the date of birth of a user.

In operation S229, the device 1000 provides the counterpart device 2000 with fingerprint information about the recognized fingerprint. The device 1000 may provide the counterpart device 2000 with the fingerprint information via the executed application. Further, the counterpart device 2000 may provide the settlement server 3000 with the received fingerprint information and may perform a settlement.

FIG. 4 is a flowchart which illustrates a method by which the device 1000 recommends a credit card to be used for settlement based on a settlement environment, according to an exemplary embodiment. Referring to FIG. 4, in operation S200, the device 1000 stores credit card information and credit card benefit information. The device 1000 may store information about a credit card possessed by a user based on a user input. The credit card information may include, for example, information about any one or more of a credit card type, a credit card number, and a credit card expiration date. Further, the device 1000 may receive credit card information from the settlement server 3000 and store the received credit card information. The settlement server 3000 may be a server operated by a credit card company, but the present exemplary embodiment is not limited thereto. In this case, the device 1000 may provide the settlement server 3000 with user profile information which is stored in the device 1000, and may receive credit card information which corresponds to the user profile information provided by the settlement server 3000. In addition, when a user possesses a newly issued credit card, the device 1000 may receive credit card information about the newly issued credit card.

The device 1000 may store credit card benefit information for each credit card stored in the device 1000 based on a user input. The device 1000 may provide a user interface to facilitate an input of credit card benefit information. A user may input credit card benefit information for each credit card which is stored in the device 1000 via the user interface. Further, the device 1000 may receive credit card benefit information from the counterpart device 2000 and may store the received credit card benefit information. The credit card benefit information received from the counterpart device 2000 may include information about benefits provided when a settlement is made through the counterpart device 2000. The device 1000 may receive the credit card benefit information from the settlement server 3000 and may store the received credit card benefit information.

The credit card benefit information may be stored by being matched with a credit card. For example, the credit card benefit information may include any one or more of price discount information, points reward information, and coupon information. Further, the credit card benefit information may include information about various benefits according to a membership store where a credit card is used.

In operation S205, the device 1000 stores the user's credit card use history. The credit card use history may include, for example, any one or more of a credit card number used for settlement, a settlement time, a settlement date, the name of a membership store, a settlement position, the name of goods, and information about benefits provided for settlement using a credit card. When a user performs a credit card settlement via the device 1000, the device 1000 may store use history of a credit card used for a settlement, but the present exemplary embodiment is not limited thereto. The credit card history information about the settlement through the device 1000 is accumulated and stored in the settlement server 3000. The device 1000 may receive the credit card history information stored in the settlement server 3000 from the settlement server 3000.

In operation S210, the device 1000 obtains information about a settlement environment. When a user tries to perform a settlement using a credit card via the device 1000, the device 1000 may obtain information about a settlement environment from at least one sensor in at least one of the device 1000, the counterpart device 2000, and the settlement server 3000. The information about a settlement environment may include information about any one or more of a settlement time, a settlement position, a membership store, and goods.

In detail, the device 1000 may obtain information about the position of the device 1000 and may determine which membership store is suitable for performing a settlement based on the obtained position information. For example, the device 1000 may determine a GPS value with respect to the position of the device 1000 by using a GPS sensor (not shown). The device 1000 may determine an identification value of an access point (AP) which is connected to the device 1000. Further, the device 1000 may determine a membership store where the device 1000 is located based on at least one of the GPS value and the AP identification value. In this case, information about the membership store corresponding to the GPS value and the AP identification value may have been previously stored in the device 1000 or a separate server (not shown).

The device 1000 may check goods information about goods that are subject to a settlement. The device 1000 may check goods information via a marker which attached to the goods, but the present exemplary embodiment is not limited thereto. The device 1000 may check goods information from the counterpart device 2000. The device 1000 may receive at least one of a date, a time, an identification value of goods, an amount of goods, and an identification value of a membership store which corresponds to the counterpart device 2000, but the present exemplary embodiment is not limited thereto.

The device 1000 may check any one or more of a points reward rate, a points reward limit, a discount rate, and a discount limit for each credit card based on information about a membership store and goods. Information about a points reward rate, a point reward limit, a discount rate, and a discount limit with respect to a membership store and goods may have previously been stored in the device 1000 or the separate server.

In operation S220, the device 1000 is used to select a credit card to be used for performing a settlement based on the settlement environment. The device 1000 may determine a credit card to be used for performing a settlement in the obtained settlement environment by using at least one of credit card information, credit card benefit information, and a settlement history.

In detail, the device 1000 may extract a credit card which has been used more than a preset number of times in the obtained settlement environment based on the credit card settlement history. For example, if a credit card A, a credit card B, a credit card C, and a credit card D are used in a membership store A and the membership store included in the obtained settlement environment is the membership store A, the device 1000 may extract the credit card A, the credit card B, the credit card C, and the credit card D from the credit card information. Further, for example, if the credit card A and the credit card C have been used in the membership store A on more than a preset number of occasions and the membership store included in the obtained settlement environment is a membership store A, the device 1000 may extract the credit card A and the credit card C from the credit card information.

For example, if the credit card A, the credit card B, the credit card C, and the credit card D are used in a time slot "11:00-14:00" and the settlement time which is included in the obtained settlement environment is within the time slot "11:00-14:00", the device 1000 may extract the credit card A, the credit card B, the credit card C, and the credit card D from the credit card information. Further, for example, if the priorities of the credit card A and the credit card B are higher among the credit cards used in the time slot "11:00-14:00" and the membership store included in the obtained settlement environment is the membership store A, the device 1000 may extract the credit card A and the credit card B from the credit card information. In this case, the priority of a credit card may be determined based on at least one of a preset standard and/or a user input. In addition, although the priority of a credit card may be determined by reflecting the benefit for each credit card, the present exemplary embodiment is not limited thereto.

Further, the device 1000 may extract a credit card based on one or more of a plurality of items which are included in the settlement history and the settlement environment. In this case, the device 1000 may determine a credit card to be extracted from the obtained settlement environment by applying a predetermined weight to each item included in the settlement history and the settlement environment and by considering the weights of the items.

In operation S225, the device 1000 recommends at least one of a plurality of credit cards to be used for performing a settlement based on the credit card benefit information. The device 1000 may compare benefits of the extracted credit cards based on the credit card benefit information, and may recommend credit cards based on a result of the comparison. The device 1000 may determine credit cards for a recommendation based on, for example, the type of credit card benefits a user prefers, and/or the amount of credit card benefits calculated into cash. The device 1000 may display, on the screen, information about benefits provided by each credit card, and thus a user may select a credit card based on the displayed benefit information.

In this case, the device 1000 may receive the credit card benefit information from the settlement server 3000. The device 1000 may transmit the information about a credit card which information is stored in the device 1000 to the settlement server 3000, and may receive the credit card benefit information from the settlement server 3000, but the present exemplary embodiment is not limited thereto.

The device 1000 may receive the credit card benefit information from a terminal (not shown) of a store. In this case, the terminal of a store may transmit information about a type and benefits of a credit card that are provided by the store, to the device 1000 in the store. The terminal of a store may provide the benefit information to the device 1000 via, for example, SMS/multimedia messaging service (MMS), but the present exemplary embodiment is not limited thereto. Further, the terminal of a store may provide the benefit information to the device 1000 via a wireless fidelity (WiFi) network.

Further, the device 1000 may automatically select a credit card to be used for a settlement based on a display mode, or may select the credit card based on a user input.

The device 1000 may display a list of recommended credit cards for performing a settlement on the lock screen of the device 1000. For example, an image of a recommended credit card may be displayed on a pattern lock point on the unlock screen of the device 1000, but the present exemplary embodiment is not limited thereto.

In this case, when a user selects a credit card image which is displayed on the lock screen, a user interface which prompts to input a personal identification number (PIN) of a selected credit card may be displayed, but the present exemplary embodiment is not limited thereto. When the user touches a credit card image which is displayed on the lock screen, the device 1000 may recognize a fingerprint of the user based on the user touch input and may unlock the device 1000 based on the recognized fingerprint and perform a settlement.

Further, when the user selects a credit card image which is displayed on the unlock screen, the user may be approved and/or authenticated based on a user image and voice. For example, the device 1000 may capture a user's face and determine whether a captured user is a true holder of the credit card which is displayed on the unlock screen. In addition, for example, the device 1000 may approve and/or authenticate a user by recognizing the iris of the user. Still further, for example, the device 1000 may record the voice of a user and may approve and/or authenticate the user based on the recorded voice.

When a user selects a predetermined credit card from the credit card recommendation list, a settlement window which relates to the selected credit card may be displayed on the screen of the device 1000. The settlement window which is displayed on the screen of the device 1000 may include, for example, any one or more of credit card information, coupon information, a settlement amount, and a PIN code input field. Further, when the user inputs a PIN code of the selected credit card in the PIN code input field, a settlement using the selected credit card may be approved.

When the settlement using the selected credit card is safely performed, a part or the whole settlement window may be displayed in a preset color. The device 1000 may check whether the settlement information about the selected credit card may be transmitted to the counterpart device 2000 and the settlement server 3000 and, when the settlement information can be safely transmitted, the settlement window may be displayed in a color which is preset by the user. The device 1000 may check whether the settlement information about the selected credit card may be safely transmitted to the counterpart device 2000 and the settlement server 3000 by receiving separate authentication information from the counterpart device 2000 and the settlement server 3000. However, the present exemplary embodiment is not limited thereto.

FIG. 5 is a flowchart which illustrates a method by which the device 1000 of FIG. 1 arranges and displays credit card images on a lock screen, according to an exemplary embodiment. Referring to FIG. 5, in operation S202, the device 1000 may receive information about a least one of credit cards that are usable for performing a settlement from the counterpart device 2000. In operation S202, when a distance between the device 1000 and the counterpart device 2000 falls within a preset range, the device 1000 may receive the information about the at least one of credit cards that are usable for performing a settlement from the counterpart device 2000. The information about the at least one of credit cards that are usable for performing a settlement may include, for example, information about any one or more of a type of a credit card, a points reward rate of a credit card, and a discount rate of a credit card, but the present exemplary embodiment is not limited thereto.

In operation S204, the device 1000 may arrange credit card images on the lock screen of the device 1000 based on at least one of the points reward rate and the discount rate. For example, the device 1000 may arrange a credit card having a higher points reward rate or a higher discount rate prior to a credit card having a lower points reward rate or a lower discount rate.

Further, the device 1000 may arrange a credit card which matches the position of the device 1000 prior to a credit card that does not match the position of the device 1000, based on the position of the device 1000. For example, the device 1000 may display a credit card K when the device 1000 is located at a membership store A. In addition, for example, when the device 1000 is located at a membership store B, the device 1000 may primarily display a credit card H. In this case, position information may include at least one of a GPS value and an identification value of an AP connected to the device 1000, but the present exemplary embodiment is not limited thereto. Still further, the device 1000 may determine a store where the device 1000 is located, based on the GPS value and the identification value of an AP connected to the device 1000. In this case, an identification value of a store that matches at least one of the GPS value and the identification value of an AP connected to the device 1000 may have previously been stored in the device 1000.

When credit card images are arranged based on the position of the device 1000, operation S202 may be omitted. In this case, the information about a credit card that is usable at a store which corresponds to the position of the device 1000 may have previously been stored in the device 1000.

Further, the device 1000 may arrange credit card images on the screen of the device 1000 based on at least one of the number of uses of a credit card by a user and user preference. For example, the device 1000 may primarily display a credit card having a relatively higher number of uses, and may secondarily display a credit card having a relatively lower number of uses. Still further, for example, the device 1000 may primarily display a credit card having a relatively higher user preference, and may secondarily display a credit card having a relatively lower user preference. The user preference may be calculated by executing any one or more of various algorithms which may be based, for example, on the number of uses of a credit card and a settlement amount of a credit card.

FIG. 6 is a flowchart which illustrates a method by which the device 1000 of FIG. 1 distinctively displays credit card images on a lock screen with emphasis, according to an exemplary embodiment. Referring to FIG. 6, in operation S206, the device 1000 may receive information about a credit card that is usable for performing a settlement from the counterpart device 2000. In operation S206, when a distance between the device 1000 and the counterpart device 2000 falls within a preset range, the device 1000 may receive the information about a credit card that is usable for performing a settlement from the counterpart device 2000. The information about a credit card that is usable for performing a settlement may include, for example, information about any one or more of a type of a credit card, a points reward rate of a credit card, and a discount rate of a credit card, but the present exemplary embodiment is not limited thereto.

In operation S208, the device 1000 displays, with emphasis, a credit card that is usable for performing a settlement, based on a predetermined standard. In operation S208, the device 1000 may display with emphasis a credit card that is usable for performing a settlement on the lock screen of the device 1000. For example, the device 1000 may display the credit card that is usable for performing a settlement by changing the color of a credit card image which corresponds to the credit card, or by increasing the thickness of an edge of a credit card image. Further, the device 1000 may display the credit card by changing the color of a pattern lock point or the thickness of an edge of a pattern lock point on which the credit card that is usable for performing a settlement is located.

In operation S208, the device 1000 may display with emphasis a predetermined credit card image based on at least one of the points reward rate and the discount rate. For example, the device 1000 may display with emphasis a credit card having a high points reward rate and a high discount rate.

The device 1000 may display with emphasis a credit card which matches the position of the device 1000 based on the position of the device 1000. For example, the device 1000 may display a credit card K with emphasis when the device 1000 is located at a membership store A. Further, for example, when the device 1000 is located at a membership store B, the device 1000 may display a credit card H with emphasis. In this case, position information may include at least one of a GPS value and an identification value of an AP connected to the device 1000, but the present exemplary embodiment is not limited thereto. Still further, the device 1000 may determine a store where the device 1000 is located, based on the GPS value and the identification value of an AP connected to the device 1000. In this case, an identification value of a store that matches at least one of the GPS value and the identification value of an AP connected to the device 1000 may have previously been stored in the device 1000.

When the credit card image is displayed with emphasis based on the position of the device 1000, operation S206 may be omitted. In this case, the information about a credit card that is usable at a store which corresponds to the position of the device 1000 may have previously been stored in the device 1000.

Further, the device 1000 may display with emphasis credit card images based on at least one of the number of uses of a credit card by a user and user preference. For example, the device 1000 may display with emphasis a credit card having a relatively high number of uses. Still further, for example, the device 1000 may display with emphasis a credit card having a relatively high user preference. The user preference may be calculated by executing any one or more of various algorithms which are based on the number of uses of a credit card and a settlement amount of a credit card.

FIG. 7 is a block diagram which schematically illustrates an example of displaying a recommended credit card when a distance between the device 1000 and the counterpart device 2000 falls within a predetermined range, according to an exemplary embodiment. Referring to FIG. 7, as the device 1000 approaches the counterpart device 2000, the counterpart device 2000 may provide the device 1000 with information about a settlement environment. The information about a settlement environment may include, for example, at least one of device information about the counterpart device 2000 and information about a settlement time, a settlement position, a membership store, and goods.

Further, the device 1000 may determine a credit card which is recommended for a user based on the information about a settlement environment and may display the recommended credit card image on the lock screen of the device 1000. Thus, when the distance between the device 1000 and the counterpart device 2000 falls within a preset range, the device 1000 may display the credit card image on the lock screen of the device 1000.

Figure 8:
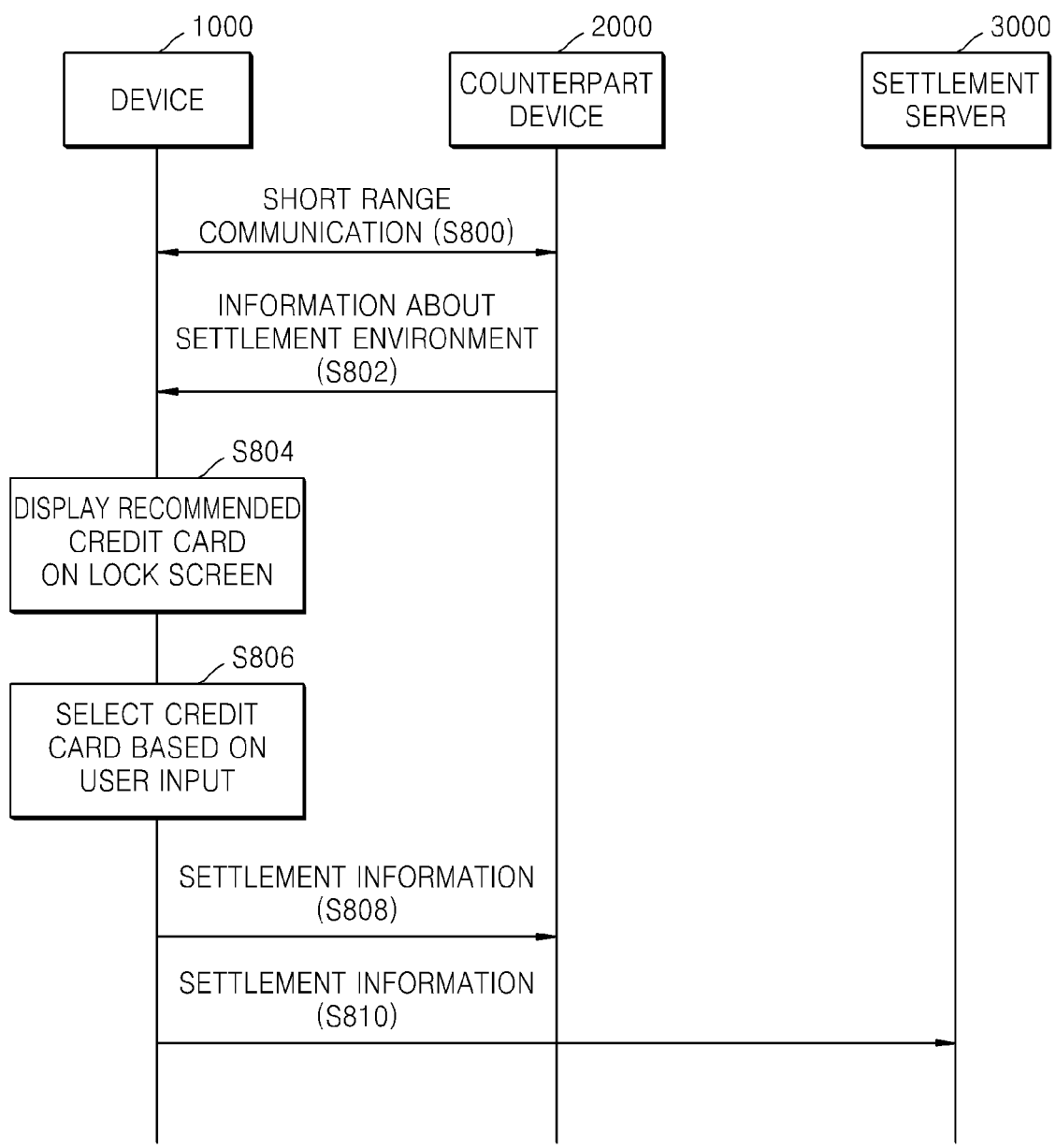
FIG. 8 is a diagram which schematically illustrates a method for displaying a recommended credit card as the device approaches the counterpart device and providing settlement information, according to an exemplary embodiment.

FIG. 8 is a diagram which schematically illustrates a method for displaying a recommended credit card when a distance between the device 1000 and the counterpart device 2000 falls within a predetermined range and for providing settlement information, according to an exemplary embodiment.

In operation S800, the device 1000 is within a short range from the counterpart device 2000. The device 1000 and the counterpart device 2000 may approach each other within a predetermined range. As the device 1000 and the counterpart device 2000 approach each other, the device 1000 and the counterpart device 2000 may be connected to each other by short range communication. The short range communication may include, for example, any one or more of NFC, ZigBee communication, radio frequency identification (RFID) communication, and ultra-wide band (UWB) communication.

In operation S802, the device 1000 receives information which relates to a settlement environment from the counterpart device 2000. The information which relates to a settlement environment may include, for example, any one or more of a settlement time, a settlement position, a membership store, and information which relates to an identification of goods.

In operation S804, the device 1000 may display the recommended credit card on the lock screen of the device 1000. The device 1000 may recommend a credit card to be used for performing a settlement based on a settlement environment and credit card benefit information, and may display a list of the recommended credit cards on the lock screen of the device 1000. The device 1000 may arrange and display a plurality of credit card images based on a predetermined standard. Further, the device 1000 may display a predetermined credit card image with emphasis.

In operation S806, the device 1000 may select a credit card to be used for a settlement based on a received user input. When a user touches a predetermined credit card image displayed on the lock screen, the device 1000 may select the credit card touched by the user as a credit card to be used for a settlement.

In operation S808, the device 1000 provides settlement information about the selected credit card to the counterpart device 2000. The device 1000 may extract credit card information about a credit card image touched by the user and user information from the memory 1700 of the device 1000, and may provide the extracted credit card information and user information to the counterpart device 2000. The credit card information may include, for example, any one or more of information about a credit card number and a credit card expiration date, and authentication information about a credit card. In addition, the user information may include information about a user identification value and a user's date of birth.

Further, if a touch input of a credit card image is maintained over a preset time interval, the device 1000 may provide the settlement information to the counterpart device 2000. When the device 1000 approaches the counterpart device 2000 while a touch input of a credit card image is maintained, the device 1000 may provide the settlement information to the counterpart device 2000, but the present exemplary embodiment is not limited thereto.

In operation S810, the device 1000 provides settlement information about a selected credit card to the settlement server 3000. When a touch input of a credit card image is maintained over a preset time interval, the device 1000 may provide the settlement information to the counterpart device 2000, but the present exemplary embodiment is not limited thereto.

Figure 9:
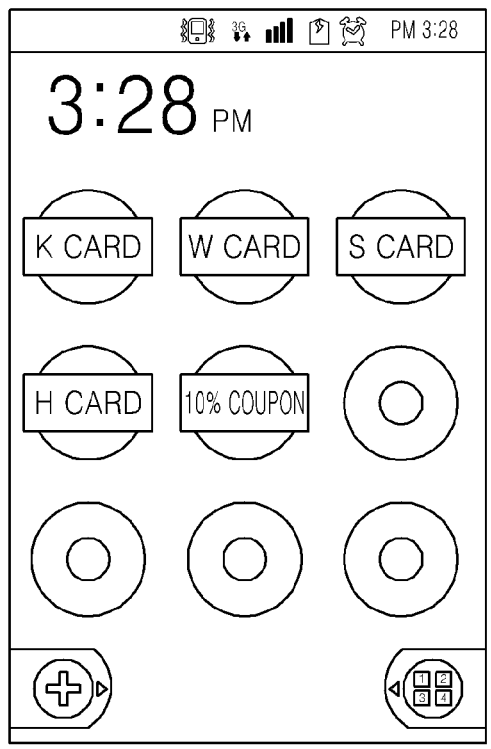
FIG. 9 illustrates an example of credit card images being displayed on a lock screen of the device, according to an exemplary embodiment.

FIG. 9 illustrates an example of credit card images being displayed on a lock screen of the device 1000, according to an exemplary embodiment. Referring to FIG. 9, a plurality of unlock pattern points may be displayed on the lock screen of the device 1000, and a predetermined credit card image may be overlappingly displayed on each lock pattern point. In this case, the credit card image to be displayed on the lock screen may be an image of a credit card that is usable for performing a settlement via the counterpart device 2000. Further, the credit card images may be arranged according to a preset standard based on the information about a type of a credit card, a points reward rate of a credit card, and a discount rate of a credit card, but the present exemplary embodiment is not limited thereto.

Further, a user may unlock the device 1000 by using the credit card images and the unlock pattern points. For example, the device 1000 may be unlocked by selecting the credit card images and the unlock pattern points in a predetermined order based on a touch-and-drag input.

Figure 10:
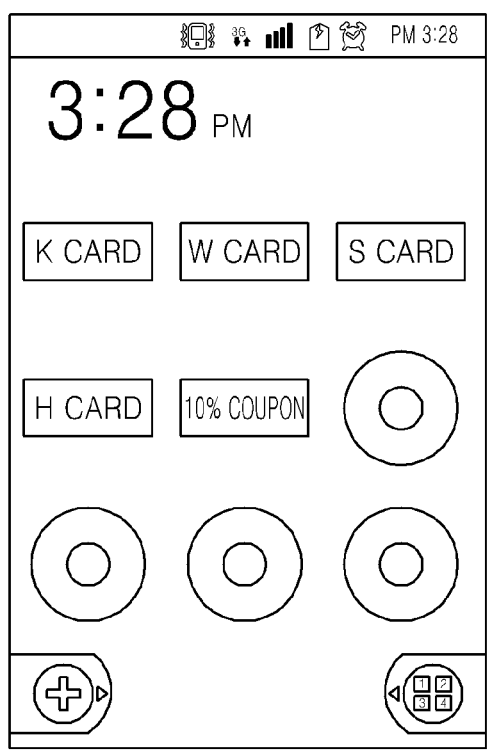
FIG. 10 illustrates an example of credit card images being displayed on a lock screen of the device, according to another exemplary embodiment.

FIG. 10 illustrates an example of credit card images being displayed on a lock screen of the device 1000, according to another exemplary embodiment. Referring to FIG. 10, a plurality of unlock pattern points may be displayed on the lock screen of the device 1000, and predetermined credit card images may be displayed for some other unlock pattern points. In this case, a credit card image to be displayed on the lock screen may be an image of a credit card that is usable for performing a settlement via the counterpart device 2000. In addition, the credit card image may be arranged according to a preset standard based on the information about a type of a credit card, a points reward rate of a credit card, and a discount rate of a credit card.

Further, a user may unlock the device 1000 by using the credit card images and the unlock pattern points. For example, the device 1000 may be unlocked by selecting the credit card images and the unlock pattern points in a predetermined order based on a touch-and-drag input.

Figure 11:
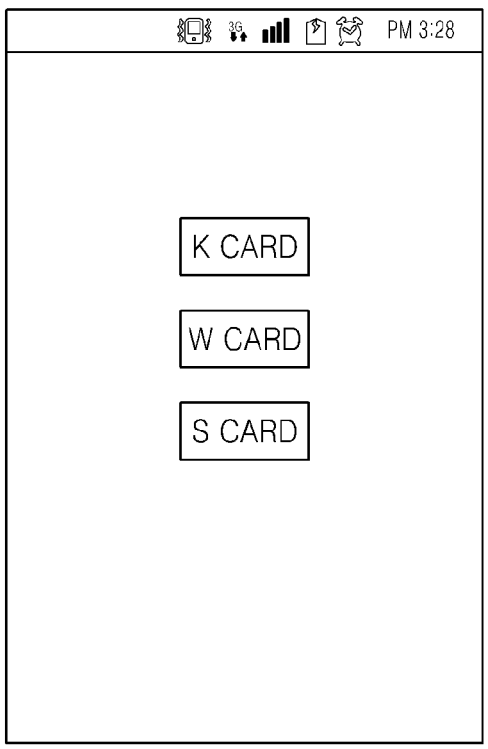
FIG. 11 illustrates an example of credit card images being displayed on a lock screen of the device, according to another exemplary embodiment.

FIG. 11 illustrates an example of credit card images being displayed on a lock screen of the device 1000, according to another exemplary embodiment. Referring to FIG. 11, credit card images may be displayed on the lock screen of the device 1000 without displaying the unlock pattern points. In this case, a credit card image to be displayed on the lock screen may be an image of a credit card that is usable for performing a settlement via the counterpart device 2000. In addition, the credit card image may be arranged according to a preset standard based on the information about a type of a credit card, a points reward rate of a credit card, and a discount rate of a credit card.

Figure 12:
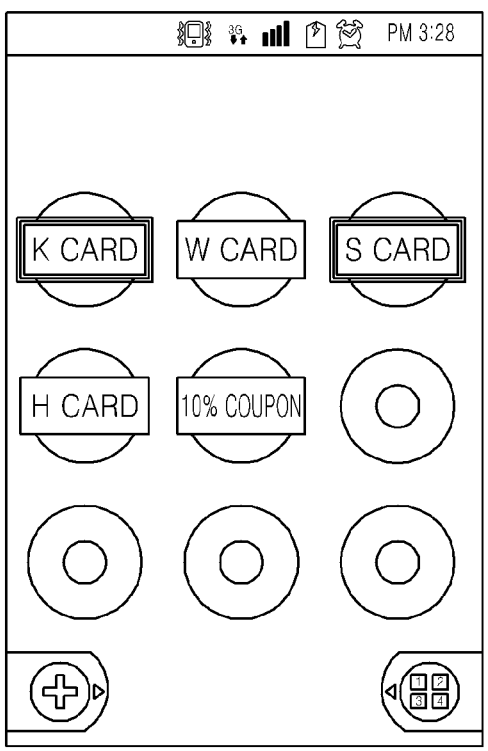
FIG. 12 illustrates an example of credit card images being distinctively displayed with emphasis, according to an exemplary embodiment.

FIG. 12 illustrates an example of credit card images being distinctively displayed with emphasis, according to an exemplary embodiment. Referring to FIG. 12, a credit card image of a credit card K having a high reward rate and a credit card image of a credit card S having a high user preference may be displayed with emphasis in order to distinguish these images with respect to the plurality of credit card images which are displayed on the lock screen of the device 1000. For example, the edge of each credit card image of the credit cards K and S may be displayed to be relatively thick. However, the present exemplary embodiment is not limited thereto, and the color, size, and/or any other suitable aspect of a credit card image may be changed and displayed distinctively. Further, the credit card image may be displayed in three dimensions.

Figure 13:
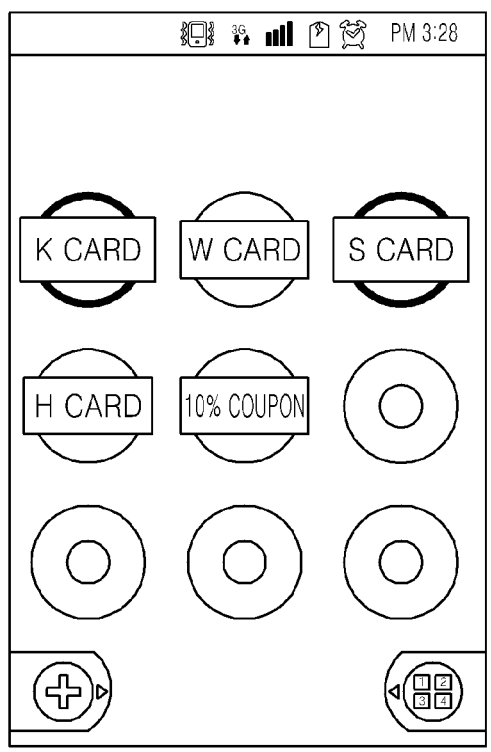
FIG. 13 illustrates an example of credit card images being distinctively displayed with emphasis, according to another exemplary embodiment.

FIG. 13 illustrates an example of credit card images being distinctively displayed with emphasis, according to an exemplary embodiment. Referring to FIG. 13, a pattern lock point which is displayed under the credit card image of each of the credit card K having a high reward rate and the credit card image of the credit card S having a high user preference may be displayed with emphasis in order to distinguish these images with respect to the credit card images which are displayed on the lock screen of the device 1000. For example, the edge of a pattern lock point under each credit card image of the credit cards K and S may be displayed to be relatively thick. However, the present exemplary embodiment is not limited thereto, and the color, size, and/or any other suitable aspect of a pattern lock point may be changed and displayed distinctively. Further, the pattern lock point may be displayed in three dimensions.

Referring to FIGS. 9, 10, 11, 12, and 13, a coupon image may be displayed together with a credit card image on the lock screen of the device 1000. The device 1000 may recommend a coupon that is usable in conjunction with a performance of a settlement which involves predetermined goods, and the device 1000 may display an image of a recommended coupon on the lock screen of the device 1000. Further, when a user selects a coupon image and a credit card image displayed on the lock screen, the device 1000 may provide the counterpart device 2000 and the settlement server 3000 with information about the coupon and the credit card selected by the user.

Figure 14:
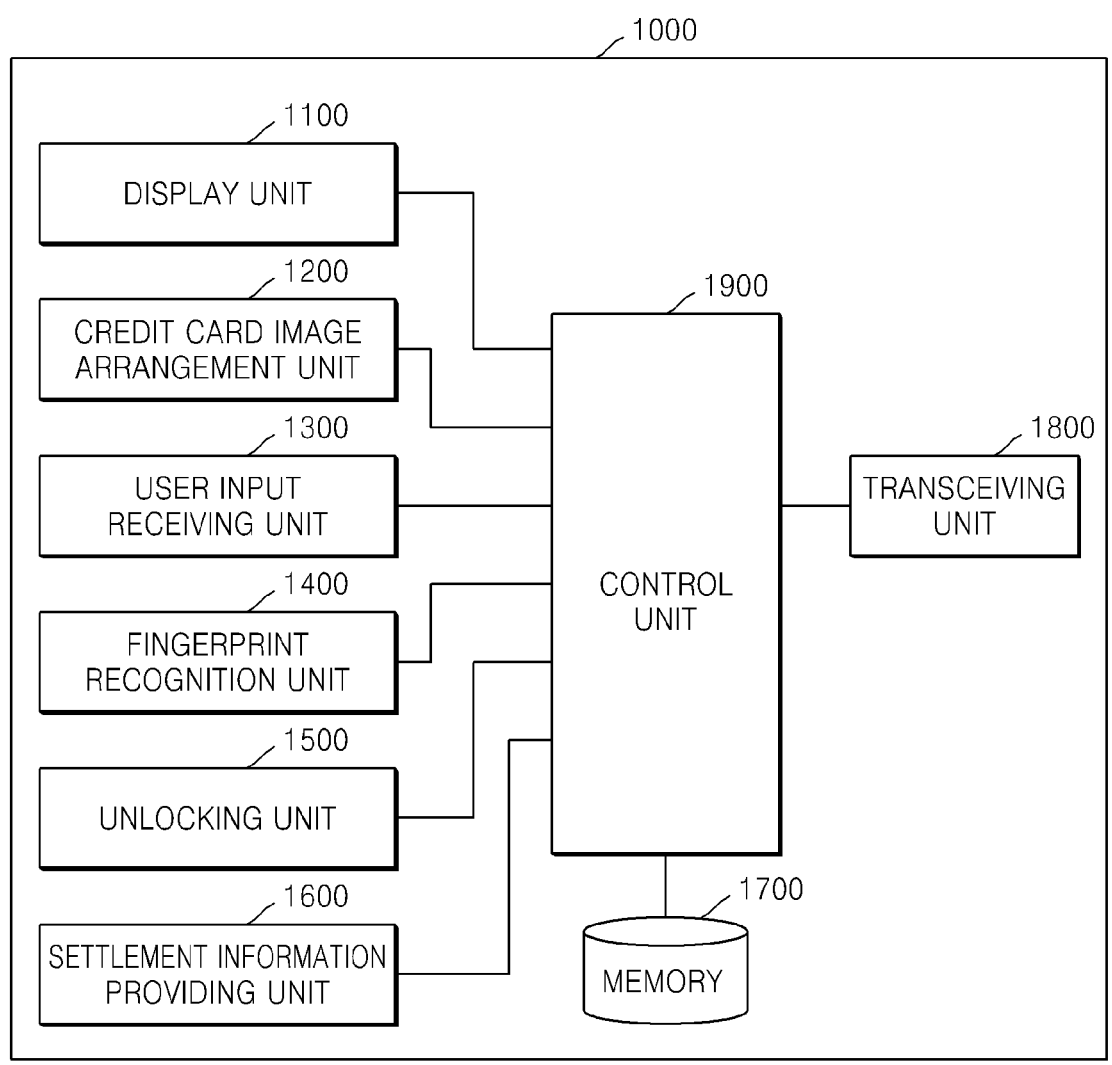
FIG. 14 is a detailed block diagram of a device, according to an exemplary embodiment.

FIG. 14 is a detailed block diagram of the device 1000, according to an exemplary embodiment. Referring to FIG. 14, the device 1000 according to the present exemplary embodiment includes a display unit 1100 (also referred to herein as a display 1100), a credit card image arrangement unit 1200 (also referred to herein as an image arranger 1200), a user input receiving unit 1300 (also referred to herein as a receiver 1300), a fingerprint recognition unit 1400 (also referred to herein as a fingerprint recognizer 1400), an unlocking unit 1500 (also referred to herein as an unlocker 1500), a settlement information providing unit 1600 (also referred to herein as a settlement information provider 1600), the memory 1700, a transceiving unit 1800 (also referred to herein as a transceiver 1800), and a control unit 1900 (also referred to herein as a controller 1900).

The display unit 1100 may display at least one credit card image on at least one of unlock pattern points displayed on the lock screen of the device 1000. The credit card image which is displayed on the lock screen may be used to unlock the device 1000. In addition, the display unit 1100 may display at least one credit card image without displaying unlock pattern points on the lock screen of the device 1000.

Further, when a distance between the device 1000 and the counterpart device 2000 falls within a preset range, the display unit 1100 may display a credit card image on the lock screen of the device 1000. For example, when the device 1000 is within a short range from the counterpart device 2000 such that communication therebetween may occur via NFC, the display unit 1100 may display a predetermined credit card image on the lock screen of the device 1000.

Further, the display unit 1100 may arrange and display a plurality of credit card images according to a predetermined standard. The display unit 1100 may display a predetermined credit card image with emphasis. The display unit 1100 may display the credit card image, for example, by changing the color of the credit card image which corresponds to a credit card that is usable for performing a settlement, or by increasing the thickness of an edge of the credit card image. The display unit 1100 may display the credit card image by changing the color of a pattern lock point which is displayed under a credit card that is usable for performing a settlement, or by increasing the thickness of an edge of the pattern lock point.

The credit card image arrangement unit 1200 arranges credit cards that are usable for performing a settlement according to a predetermined standard. The credit card image arrangement unit 1200 may arrange credit card images according to a predetermined standard by using information about the credit card image that is usable for performing a settlement. In this case, when a distance between the device 1000 and the counterpart device 2000 falls within a present range, the device 1000 may receive the information about the credit card that is usable for performing a settlement from the counterpart device 2000. The information about the credit card that is usable for performing a settlement may include, for example, information about any one or more of a type of a credit card, a points reward rate of a credit card, and a discount rate of a credit card, but the present exemplary embodiment is not limited thereto. The credit card image arrangement unit 1200 may recommend a plurality of credit cards to be used for a settlement and may distinctively display the recommended credit cards.

The credit card image arrangement unit 1200 may arrange credit card images on the lock screen of the device 1000 based on at least one of points reward rate and a discount rate. For example, the device 1000 may arrange a credit card having a higher points reward rate or a higher discount rate prior to a credit card having a lower points reward rate or a lower discount rate.

The credit card image arrangement unit 1200 may arrange credit cards which match the position of the device 1000 in a primary manner, as compared to credit cards that do not match the position of the device 1000, which may be arranged in a secondary manner, based on the position of the device 1000. For example, the credit card image arrangement unit 1200 may primarily arrange a credit card K when the device 1000 is located at a membership store A. Further, for example, when the device 1000 is located at a membership store B, the device 1000 may primarily arrange a credit card H. In this case, position information may include at least one of a GPS value and an identification value of an AP connected to the device 1000, but the present exemplary embodiment is not limited thereto. In addition, the credit card image arrangement unit 1200 may determine a store where the device 1000 is located, based on at least one of the GPS value and the identification value of an AP connected to the device 1000. In this case, an identification value of a store that matches at least one of the GPS value and the identification value of an AP connected to the device 1000 may have previously been stored in the device 1000. The information about the credit card that may be used at a store which corresponds to the position of the device 1000 may have previously been stored in the device 1000, but the present exemplary embodiment is not limited thereto.

The credit card image arrangement unit 1200 may arrange credit card images on the lock screen of the device 1000 based on at least one of the number of uses of a credit card by a user and user preference. For example, the credit card image arrangement unit 1200 may primarily arrange a credit card having a relatively higher number of uses with respect to a secondary arrangement of a credit card having a relatively lower number of uses. In addition, for example, the device 1000 may primarily arrange a credit card having a relatively higher user preference with respect to a secondary arrangement of a credit card having a relatively lower user preference. The user preference may be calculated by executing any one or more of various algorithms which may be based on the number of uses of a credit card and a settlement amount of a credit card.

The user input receiving unit 1300 may receive a touch input from a user which respect to a credit card image. When a user touches a predetermined credit card image which is displayed on the lock screen of the device 1000, the user input receiving unit 1300 may receive a user touch input.

The fingerprint recognition unit 1400 may recognize a user's fingerprint based on a received touch input. The fingerprint recognition unit 1400 may recognize a user's fingerprint from the lock screen of the device 1000 by using the fingerprint recognition sensor included in the device 1000. The fingerprint recognition sensor may be, for example, at least one of an optical sensor, a heat detection sensor, a condensing sensor, and semiconductor type and electric field type sensors, but the present exemplary embodiment is not limited thereto.

The unlocking unit 1500 may unlock the device 1000 based on the recognized fingerprint. The unlocking unit 1500 may compare the recognized fingerprint with user-specific fingerprint information which has previously been stored in the device 1000, and may unlock the device 1000 when the recognized fingerprint matches the user-specific fingerprint information as indicated with respect to a predetermined value.

In this case, the user-specific fingerprint information may be stored in the device 1000 to be matched with each credit card image. The unlocking unit 1500 may compare the fingerprint information which corresponds to the touched credit card image (i.e., the received touch input) with the recognized fingerprint.

When the device 1000 is unlocked, the settlement information providing unit 1600 may provide settlement information which corresponds to the credit card image touched by a user to the counterpart device 2000. In particular, when the device 1000 is unlocked, the settlement information providing unit 1600 may execute an application in order to transmit settlement information. The settlement information providing unit 1600 may provide the settlement information to the counterpart device 2000 by using the executed application.

The settlement information providing unit 1600 may extract, from the memory 1700, user information and credit card information about a credit card image touched by a user, and may provide the counterpart device 2000 with the extracted credit card information and user information. The credit card information may include, for example, information about a credit card number and a credit card expiration date, and authentication information about a credit card. The user information may include, for example, information about a user identification value and the date of birth of a user.

The settlement information providing unit 1600 may provide the settlement information to the counterpart device 2000 when the touch input on a credit card image continues or is maintained over a predetermined time interval. In so doing, if a distance between the device 1000 and the counterpart device 2000 falls within a predetermined range, the settlement information providing unit 1600 may provide the settlement information to the counterpart device 2000, but the present exemplary embodiment is not limited thereto.

The settlement information providing unit 1600 may provide the settlement information to the counterpart device 2000 when fingerprint information obtained based on the touch input on a credit card image is determined to be valid with respect to the stored information which relates to the user of the credit card.

The settlement information providing unit 1600 may provide the fingerprint information about the recognized fingerprint to the counterpart device 2000. In this case, the counterpart device 2000 provides the received fingerprint information to the settlement server 3000, and thus, a settlement may be performed.

The memory 1700 may store various pieces of information which are useful and/or required in order for the device 1000 to display a credit card image on the lock screen and to provide information to the counterpart device 2000 for performing a credit card settlement.

The transceiving unit 1800 may transceive information which is usable for performing a credit card settlement via the counterpart device 2000 and a settlement server 3000. In particular, the transceiving unit 1800 transceives with the counterpart device 2000 and the settlement server 3000 various pieces of information which are useful and/or required in order for the device 1000 to display a credit card image on the lock screen of the device 1000.

The control unit 1900 may control an overall operation of the device 1000 so that the device 1000 displays a credit card image on the lock screen and provides the information about a credit card settlement to the counterpart device 2000. The control unit 1900 may control the display unit 1100, the credit card image arrangement unit 1200, the user input receiving unit 1300, the fingerprint recognition unit 1400, the unlocking unit 1500, the settlement information providing unit 1600, the memory 1700, and the transceiving unit 1800.

Figure 15:
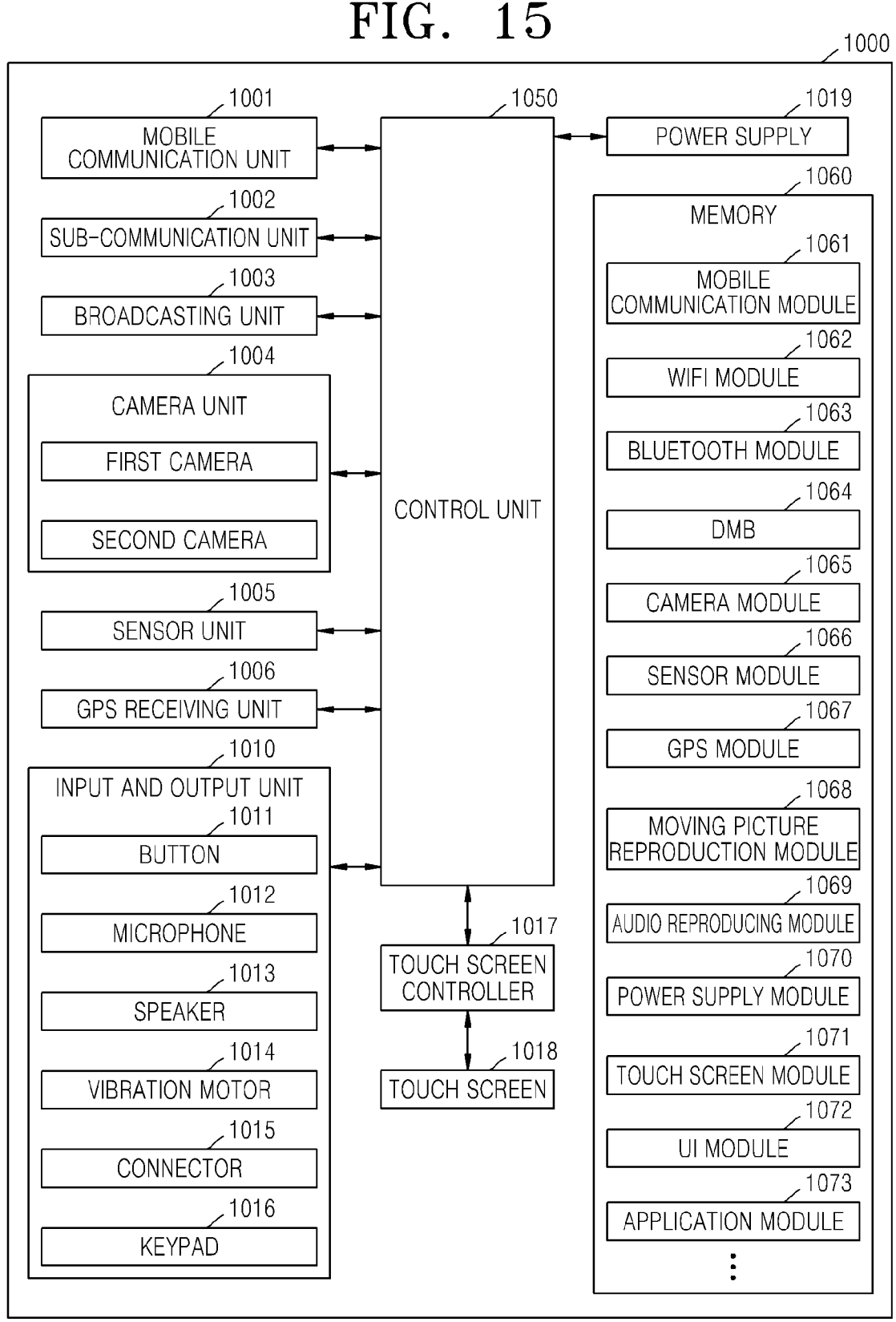
FIG. 15 is a block diagram of a device, according to another exemplary embodiment.

FIG. 15 is a block diagram of the device 1000, according to another exemplary embodiment. Referring to FIG. 15, a mobile communication unit 1001 performs call setting and data communication with a local station via a cellular network, such as 3G/4G. A sub-communication unit 1002 performs a function for short range communication, such as Bluetooth or NFC. A broadcast receiving unit 1003 may receive a digital multimedia broadcasting (DMB) signal.

A camera unit 1004 includes a lens and optical elements for capturing a picture or a moving picture.

A sensor unit 1005 may include at least one of a gravity sensor for detecting a motion of the device 1000, an illuminance sensor for detecting the brightness of light, a proximity sensor for detecting a degree of proximity of a person, and a motion sensor for detection a motion of a person.

A GPS receiving unit 1006 receives a GPS signal from an artificial satellite. Thus, various services may be provided to a user by using the GPS signal.

An input/output unit 1010 provides an interface for use in conjunction with an external device or a person and may include a button 1011, a microphone 1012, a speaker 1013, a vibration motor 1014, a connector 1015, and a keypad 1016.

A touch screen 1018 receives a touch input from a user. The touch input may be executed, for example, by performing at least one of a drag gesture and/or a tap gesture. A touch screen controller 1017 transfers a touch input that is received via the touch screen 1018, to a control unit or processor 1050. A power supply unit 1019 is connected to a battery or an external power source to supply power to the device 1000.

The control unit 1050 executes programs which are stored in a memory 1060 and thus provides the counterpart device 2000 with settlement information by using a credit card image which is displayed on the lock screen according to one or more exemplary embodiments.

The programs stored in the memory 1060 may be classified into a plurality of models: a mobile communication module 1061, a WiFi module 1062, a Bluetooth module 1063, a DMB module 1062, a camera module 1065, a sensor module 1066, a GPS module 1067, a moving picture reproduction module 1068, an audio reproduction module 1069, a power module 1070, a touch screen module 1071, a user interface (UI) module 1072, and an application module 1073. In addition, the at least one program which is stored in the memory 1060 may include a module which is usable for performing NFC communication and may include an NFC module (not shown) instead of or in addition to a Bluetooth module 1063. Further, a function of each module may be intuitively understood from its name by one of ordinary skill in the art.

An operation of providing settlement information by using a credit card image on a lock screen according to an exemplary embodiment is described below.

At least one of the mobile communication module 1061, the WiFi module 1062, the Bluetooth module 1063, and the NFC module may receive information about a credit card that is usable for performing a settlement from the counterpart device 2000. For example, as the device 1000 approaches the counterpart device 2000, the device 1000 may receive credit card information via the NFC module.

The application module 1073 may determine a credit card image to be displayed on the lock screen by using the credit card information, and may determine how the determined credit card image is arranged and displayed. The UI module 1072 may display a credit card image on the lock screen based on the determination of the application module 1073.

The touch screen module 1071 may receive a touch input with respect to a credit card image from a user, and may recognize a fingerprint of a user based on the received touch input.

The application module 1073 may unlock the device 1000 when the recognized fingerprint information is similar to fingerprint information which is stored in the memory 1060. The application module 1073 may provide the credit card information about the credit card which is selected based on the received touch input and the recognized fingerprint information to the counterpart device 2000. In this case, the application module 1073 may provide the credit card information and the fingerprint information to the counterpart device via at least one of the mobile communication module 1061, the WiFi module 1062, the Bluetooth module 1063, and the NFC module.

As described above, such connection information is transferred to a push server via a cellular network and is finally pushed to a second mobile terminal that is selected by a user from a contact list. When a mobile terminal that acquires the connection information makes a request for connection via a wireless local area network (LAN), the application module 1073 in interaction with the WiFi module 1062 forms a wireless LAN link with a counterpart mobile terminal.

Next, a mode by which the device 1000 operates as a second mobile terminal is described below. When a push message which includes the connection information is received via the mobile communication unit 1001, the application module 1073 displays, on the lock screen, a selection menu requesting whether to set a wireless LAN link with the first mobile terminal. If a user touches a button for approving connection via the touch screen 1018, the application module 1073, in interaction with the WiFi module 1062, forms a wireless LAN link with the first mobile terminal.

An exemplary embodiment may be embodied in form of a recording medium which includes computer executable command languages such as a program module which may be executed by a computer. A transitory or non-transitory computer-readable storage medium may be a useable medium that may be accessed by a computer and may include all of volatile and non-volatile media or a separable and inseparable media. Further, the computer-readable storage medium may include all of a computer storage medium and a communication medium. The computer-readable storage medium may include all of volatile and non-volatile media or a separable and inseparable media embodied by a certain method or technology for storing information such as computer-readable command languages, data structures, program modules, and/or other data. The communication medium may typically include computer-readable command languages, data structures, program modules, or other data of a modulated data signal, and/or any other suitable transmission mechanism, and may also include a certain information forwarding medium.

While the present inventive concept has been particularly shown and described with reference to exemplary embodiments thereof, it will be understood by those skilled in the art that various changes in form and details may be made with respect to the exemplary embodiments without departing from the spirit and scope of the present inventive concept as defined by the appended claims.

What is claimed is:

1. A method of a mobile device for providing information to a point-of-sale (POS) device, the method comprising:

displaying a lock screen including an unlocking option for receiving a user input for unlocking the mobile device;

receiving, by the mobile device, information of the POS device, via wireless communication, while the mobile device is locked and the lock screen is displayed, wherein a first credit card image corresponding to a first credit card and a second credit card image corresponding to a second credit card are stored in the mobile device, and wherein the first credit card is assigned with a priority over the second credit card based on at least one among a preset standard and a user input;

based on the information of the POS device being received while the mobile device is locked and the lock screen is displayed; displaying, on a display of the mobile device, the first credit card image together with a portion of over the second credit card image corresponding to the second credit card over which the first credit card is assigned priority, without displaying the unlocking option;

while the first credit card image and the portion of the second credit card image are displayed, receiving, by a touch screen of the mobile device, from a user, a touch input related to a selection of one among the first credit card image and the second credit card image;

receiving, via a fingerprint sensor of the mobile device, a fingerprint input that is obtained directly from a finger of the user of the mobile device on the fingerprint sensor;

determining, by the mobile device, whether the received fingerprint input matches user fingerprint information that is stored in the mobile device;

determining, by the mobile device, whether the mobile device is within a communicative range of the wireless communication of the POS device; and based on the received fingerprint input being determined to match the user fingerprint information and the mobile device being determined to be within the communicative range of the wireless communication of the POS device, providing, by the mobile device, to the POS device, one among first information of the first credit card and second information of the second credit card that corresponds to the selected one among the first credit card image and the second credit card image.

2. The method of claim 1, further comprising, based on the touch input being received, determining, by the mobile device, whether the received fingerprint input is maintained over a time interval, wherein, the providing the first information comprises, based on the received fingerprint in put being determined to match the user fingerprint information, the received fingerprint input being determined to be maintained over the time interval, and the mobile device being determined to be within the communicative range of the wireless communication of the POS device, providing, by the mobile device, to the POS device, the one among the first information of the first credit card and the second information of the second credit card that corresponds to the selected one among the first credit card image and the second credit card image.

3. The method of claim 1, further comprising, based on the touch input being received, recognizing, by the mobile device, a fingerprint of the user, based on the received fingerprint input.

4. The method of claim 1, wherein the one among the first information of the first credit card and the second information of the second credit card is provided via near field communication (NFC).

5. A mobile device for providing information to a point-of-sale (POS) device, the mobile device comprising:
a memory storing instructions; and
a processor configured to execute the stored instructions to at least:
control to display a lock screen including an unlocking option for receiving a user input for unlocking the mobile device;
receive information of the POS device, via wireless communication, while the mobile device is locked and the lock screen is displayed, wherein a first credit card image corresponding to a first credit card and a second credit card image corresponding to a second credit card are stored in the mobile device, and wherein the first credit card is assigned with a priority over the second credit card based on at least one among a preset standard and a user input;
based on the information of the POS device being received while the mobile device is locked and the lock screen is displayed, control to display, on a display of the mobile device, the first credit card image together with a portion of the second credit card image corresponding to the second credit card over which the first credit card is assigned priority, without displaying the unlocking option;
while the first credit card image and the portion of the second credit card image are displayed, receive, by a touch screen of the mobile device, from a user, a touch input related to a selection of one among the first credit card image and the second credit card image;
receive, via a fingerprint sensor of the mobile device, the fingerprint input directly that is obtained from a finger of the user of the mobile device on the fingerprint sensor;
determine whether the received fingerprint input matches user fingerprint information that is stored in the mobile device;
determine whether the mobile device is within a communicative range of the wireless communication of the POS device; and
based on the received fingerprint input being determined to match the user fingerprint information and the mobile device being determined to be within the communicative range of the wireless communication of the POS device, control to provide, to the POS device, one among first information of the first credit card and second information of the second credit card that corresponds to the selected one among the first credit card image and the second credit card image.

6. The mobile device of claim 5, wherein the processor is further configured to execute the stored instructions to, based on the touch input being received:
determine whether the received fingerprint input is maintained over a time interval; and
based on the received fingerprint input being determined to match the user fingerprint information, the received fingerprint input being determined to be maintained over the time interval, and the mobile device being determined to be within the communicative range of the wireless communication of the POS device, control to provide, to the POS device, the one among the first information of the first credit card and the second information of the second credit card that corresponds to the selected one among the first credit card image and the second credit card image.

7. The mobile device of claim 5, wherein the processor is further configured to execute the stored instructions to, based on the touch input being received, recognize a fingerprint of the user, based on the received fingerprint input.

8. The mobile device of claim 5, wherein the one among the first information of the first credit card and the second information of the second credit card is provided via near field communication (NFC).

9. A non-transitory computer-readable medium storing programs including instructions executable by one or more processors of a mobile device for providing information to a point-of-sale (POS) device, to cause the one or more processors to at least:
control to display a lock screen including an unlocking option for receiving a user input for unlocking the mobile device;
obtain information of the POS device, via wireless communication, while the mobile device is locked and the lock screen is displayed, wherein a first credit card image corresponding to a first credit card and a second credit card image corresponding to a second credit card are stored in the mobile device, and wherein the first credit card is assigned with a priority over the second credit card based on at least one among a preset standard and a user input;
based on the information of the POS device being received while the mobile device is locked and the lock screen is displayed, control to display, on a display of the mobile device, the first credit card image together with a portion of the second credit card image corresponding to the second credit card over which the first credit card is assigned priority, without displaying the unlocking option;
while the first credit card image and the portion of the second credit card image are displayed, receive, by a touch screen of the mobile device, from a user, a touch input related to a selection of one among the first credit card image and the second credit card image;
receive, via a fingerprint sensor of the mobile device, a fingerprint input directly that is obtained from a finger of the user of the mobile device on the fingerprint sensor;
determine whether the received fingerprint input matches user fingerprint information that is stored in the mobile device;
determine whether the mobile device is within a communicative range of the wireless communication of the POS device; and
based on the received fingerprint input being determined to match the user fingerprint information and the mobile device being determined to be within the communicative range of the wireless communication of the POS device, control to provide, to the POS device, one among first information of the first credit card and second information of the second credit card that corresponds to the selected one among the first credit card image and the second credit card image.

10. The non-transitory computer-readable medium of claim 9, wherein the instructions further cause the one or more processors to, based on the touch input being received:
determine whether the received fingerprint input is maintained over a time interval; and
based on the received fingerprint input being determined to match the user fingerprint information, the received fingerprint input being determined to be maintained over the time interval, and the mobile device being determined to be within the communicative range of the wireless communication of the POS device, control to provide, to the POS device, the one among the first information of the first credit card and the second information of the second credit card that corresponds to the selected one among the first credit card image and the second credit card image.

11. The non-transitory computer-readable medium of claim 9, wherein the instructions further cause the processor to, based on the touch input being received, recognize a fingerprint of the user, based on the received fingerprint input.

* * * * *